(12) United States Patent
Zou et al.

(10) Patent No.: US 8,973,161 B2
(45) Date of Patent: Mar. 3, 2015

(54) METHOD AND APPARATUS FOR NANOMECHANICAL MEASUREMENT USING AN ATOMIC FORCE MICROSCOPE

(71) Applicants: Qingze Zou, Bridgewater, NJ (US); Juan Ren, Highland Park, NJ (US)

(72) Inventors: Qingze Zou, Bridgewater, NJ (US); Juan Ren, Highland Park, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 13/925,441

(22) Filed: Jun. 24, 2013

(65) Prior Publication Data
US 2013/0347147 A1    Dec. 26, 2013

Related U.S. Application Data

(60) Provisional application No. 61/663,230, filed on Jun. 22, 2012.

(51) Int. Cl.
| | |
|---|---|
| *G01Q 60/38* | (2010.01) |
| *G01Q 30/12* | (2010.01) |
| *G01Q 60/36* | (2010.01) |
| *B82Y 35/00* | (2011.01) |
| *G01Q 30/14* | (2010.01) |

(52) U.S. Cl.
CPC .............. *G01Q 60/38* (2013.01); *G01Q 60/366* (2013.01); *B82Y 35/00* (2013.01); *G01Q 30/12* (2013.01); *G01Q 30/14* (2013.01)
USPC .............................................. 850/3; 850/33

(58) Field of Classification Search
CPC ........ B82Y 35/00; B82Y 15/00; G01Q 30/14; G01Q 30/12; G01Q 10/065; G01Q 70/00
See application file for complete search history.

(56) References Cited

U.S. PATENT DOCUMENTS

| | | | | |
|---|---|---|---|---|
| 5,206,702 | A * | 4/1993 | Kato et al. ...................... | 356/493 |
| 5,331,275 | A * | 7/1994 | Ozaki et al. .............. | 324/750.22 |
| 5,431,055 | A * | 7/1995 | Takata et al. .................... | 73/618 |
| 5,898,106 | A * | 4/1999 | Babcock et al. ................. | 73/105 |

(Continued)

OTHER PUBLICATIONS

Pharr et al, "On the generality of the relationship among contact stiffness, contact area, and elastic modulus during indentation", Journal of Materials Research, vol. 7, No. 3, 1992, pp. 613-617.

(Continued)

*Primary Examiner* — David A Vanore
(74) *Attorney, Agent, or Firm* — Stephen H. Eland; Dann, Dorfman, Herrell & Skillman

(57) ABSTRACT

A control-based approach is provided for achieving accurate indentation quantification in broadband and in-liquid nanomechanical property measurements using atomic force microscope (AFM). Accurate indentation measurement is desirable for probe-based material property characterization because the force applied and the indentation generated are the fundamental physical variables that are measured in the characterization process. Large measurement errors, however, occur when the measurement frequency range becomes large (i.e., broadband), or the indentation is measured in liquid on soft materials. Such large measurement errors are generated due to the inability of the conventional method to account for the convolution of the instrument dynamics with the viscoelastic response of the soft sample when the measurement frequency becomes large, and the random-like thermal drift and the distributive hydrodynamic force effects when measuring the indentation in liquid.

17 Claims, 18 Drawing Sheets

(56) References Cited

U.S. PATENT DOCUMENTS

| | | | |
|---|---|---|---|
| 5,983,712 A * | 11/1999 | Lindsay et al. | 73/105 |
| 6,353,221 B1 * | 3/2002 | Elings | 850/33 |
| 6,389,886 B2 * | 5/2002 | Daniels et al. | 73/105 |
| 7,045,780 B2 * | 5/2006 | Kley | 250/306 |
| 7,098,678 B2 * | 8/2006 | Altmann et al. | 850/2 |
| 7,312,619 B2 * | 12/2007 | Altmann et al. | 850/1 |
| 7,509,844 B2 * | 3/2009 | Wang et al. | 73/105 |
| 7,658,097 B2 * | 2/2010 | Su et al. | 73/105 |
| 7,845,215 B2 * | 12/2010 | Cantrell et al. | 73/105 |
| 8,438,927 B2 * | 5/2013 | Shekhawat et al. | 73/603 |
| 8,590,061 B1 * | 11/2013 | Zou et al. | 850/4 |
| 2006/0267596 A1 * | 11/2006 | Cumpson | 324/601 |
| 2008/0134771 A1 * | 6/2008 | Schimmel et al. | 73/104 |
| 2010/0205699 A1 * | 8/2010 | Tachizaki et al. | 850/47 |
| 2011/0036170 A1 * | 2/2011 | Shekhawat et al. | 73/603 |
| 2013/0098145 A1 * | 4/2013 | Oh et al. | 73/81 |
| 2013/0347147 A1 * | 12/2013 | Zou et al. | 850/40 |

OTHER PUBLICATIONS

Derjaguin et al, "Effect of contact deformations on the adhesion of particles," Journal of Colloid and Interface Science, vol. 53, pp. 314-326, 1975.

Cheng et al, "General relationship between contact stiffness, contact depth, and mechanical properties for indentation in linear viscoelastic solids using axisymmetric indenters of arbitrary profiles," Applied Physics Letters, vol. 87, pp. 111914-111916, 2005.

Butt et al, "Force measurements with the atomic force microscope: Technique, interpretation and applications," Surface Science Reports, vol. 59, pp. 1-152, 2005.

Xu et al, "A model-based approach to compensate for the dynamics convolution effect on nanomechanical property measurement," Journal of Applied Physics, vol. 107, p. 064315, 2010.

Xie et al, "Compensation for the dynamics effect on nanoscale broadband viscosity measurements using adaptive filtering approach," IEEE Trans. on Instrumentation and Measurement, vol. 60, pp. 1115-1162, 2011.

Fischer-Cripps, "Critical review of analysis and interpretation of nanoindentation test data," Surface and Coatings Technology, vol. 200, p. 41534165, 2006.

Eysden et al, "Resonant frequencies of a rectangular cantilever beam immersed in a fluid," Journal of Applied Physics, vol. 100, p. 114916, 2006.

Briscoe et al, "Nano-indentation of polymeric surfaces," Journal of Physics D: Applied Physics, vol. 31, p. 2395, 1998.

Zhu et al, "Cell mechanics: Mechanical response, cell adhesion, and molecular deformation," Annual Review of Biomedical Engineering, vol. 2, pp. 189-226, 2000.

Xu et al, "Nanoscale broadband viscoelastic spectroscopy of soft materials using iterative control," Experimental Mechanics, in press, 2011.

Xu et al, "Broadband measurement of ratedependent viscoelasticity at nanoscale using scanning probe microscope: Poly(dimethylsiloxane) example," Applied Physics Letters, vol. 93, p. 133103, 2008.

Zhang et al, "High-speed force load in force measurement in liquid using scanning probe microscope," Review of Scientific Instruments, in press, 2011.

Kim et al, "Model-less inversion-based iterative control for output tracking: Piezo actuator example," in Proceedings of American Control Conference, (Seattle, WA), pp. 2710-2715, Jun. 2008.

Bhushan et al, "Nanoindentation hardness measurements using atomic force microscopy," Applied Physics Letters, vol. 64, pp. 1653-1655, 1994.

Prakash et al, "Theoretical basis of parametric-resonance-based atomic force microscopy," Physical Review B, vol. 79, No. 9, pp. 094304-1-094304-10, 2009.

Beyder et al, "Reducing probe dependent drift in atomic force microscope with symmetrically supported torsion levers," Review of Scientific Instruments, vol. 77, p. 056105, 2006.

Sader, "Frequency response of cantilever beams immersed in viscous fluids with applications to the atomic force microscope," Journal of Applied Physics, vol. 84, pp. 64-76, 1998.

Kim et al, "Iterative control approach to high-speed force-distance curve measurement using afm: Time-dependent response of pdms example," Ultramicroscopy, vol. 108, pp. 911-920, 2008.

Lin et al, "Viscoelastic characterization and modeling of polymer transducers for biological applications," Journal of Microelectromechanical Systems, vol. 18, pp. 1087-1099, Oct. 2009.

* cited by examiner

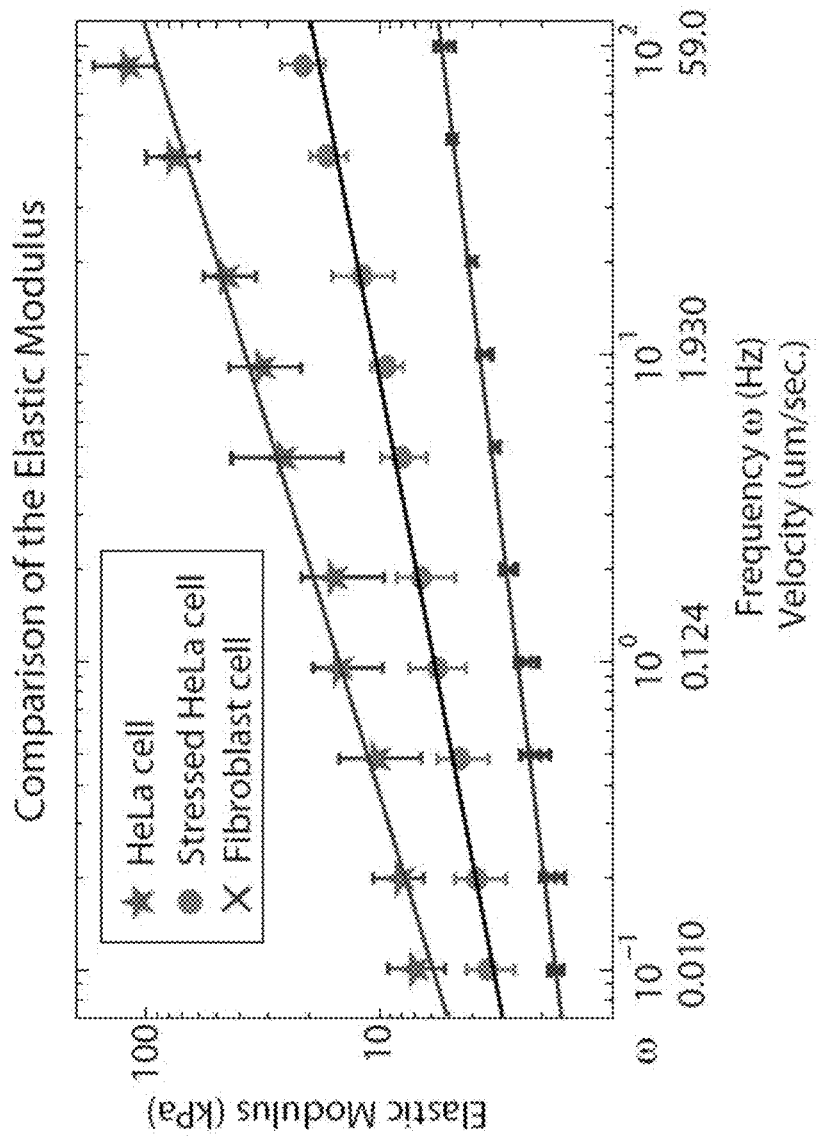

METHOD AND APPARATUS FOR NANOMECHANICAL MEASUREMENT USING AN ATOMIC FORCE MICROSCOPE

This invention was made with government support under CMMI-1066055 awarded by the National Science Foundation (NSF). The government has certain rights in the invention.

BACKGROUND

Indentation-based approach has been implemented to measure material properties of soft materials at nano-scale, including polymers, live biomaterials and food product. For example, by measuring the excitation force applied from the probe to the sample surface and the corresponding indentation generated in the sample, the mechanical properties such as the elastic modulus or the complex compliance (for viscoelastic materials) of the sample can be quantified from the contact mechanics model of the probe-sample interaction dynamics (e.g., the Hertzian model or the DMT model). As the force applied and the indentation generated act as the input and the output, respectively, to the probe-sample interaction contact model, the accuracy of the indentation measurement dictates that of the nano-mechanical properties measured. Therefore, accurate indentation measurement is desirable for the accurate characterization of the nanomechanical properties of soft material.

Atomic Force Microscopes (AFM) have been used to measure nano-mechanical properties of soft materials using an indentation measurement. However, conventional indentation measurement has limitations and results in large errors when the measurement frequency becomes large, or the indentation is measured in liquid. In the method currently used in commercial AFM systems, indentation is obtained from the difference of the AFM cantilever deflection on the specimen and that on a reference hard sample when the same input is applied to drive the z-piezo actuator of the AFM in both measurements. Such a method may be adequate for indentation measurement when the measurement is in air and the measurement frequency is relatively low. However, when the measurement frequency increases and becomes close to the bandwidth of the AFM z-axis dynamics, the instrument hardware dynamics (e.g, the AFM z-dynamics) can be convoluted with the viscoelastic response of the soft specimen, and affect the measured cantilever displacement (i.e., the cantilever deflection). As a result, the indentation obtained is distorted by the instrument hardware dynamics response.

Furthermore, for nano-mechanical measurement in liquid, the motion of the cantilever, unlike that in air, is significantly affected by the thermal drift effect and the hydrodynamic force. Accurate broadband and accurate in-liquid indentation measurements are desired because the mechanical behavior of soft materials is rate-dependent, and materials such as live biological samples (e.g., live cell) are studied in liquid to maintain the behavior and/or chemical and physical properties of these materials. Therefore, there is a need to develop a new approach to nano-indentation measurement of soft materials using AFM.

It is challenging to achieve accurate broadband or in-liquid indentation measurements. Due to the hardware dynamics-viscoelasticity convolution effect during the broadband nanomechanical measurement, the amplitude of the excitation force applied can be severely distorted and become excessively large at some frequencies and/or excessively small at others, i.e., the measurement suffers from saturation and/or poor signal-to-noise ratio issues. Such a convolution-caused force distortion can be compensated for by using control techniques to track the excitation force on the soft specimen accurately. However, when the same input is applied to a hard sample (for measuring the indentation), dynamics convolution effect on the force-distance measurement of the hard reference sample still exists. This dynamics convolution effect on the indentation measurement is caused by the difference between the nano-mechanical properties of the soft specimen and that of the hard sample, and the difference becomes more pronounced as the measurement frequency range increases (i.e., broadband). Moreover, when measuring the indentation in liquid, the thermal drift effect generates an asymmetric disturbance force on the cantilever (due to the asymmetric geometric configuration of the cantilever), resulting in the fluctuation of the cantilever deflection of random-motion characteristics.

Although feedback control can be used to compensate for the drift effect, the conventional indentation method is generally not compatible with feedback control framework, i.e., under the feedback controller, the input to drive the piezoactuator during the force-distance measurement of the soft sample and that of the hard sample are different, and the same cantilever deflection is obtained on both the soft and the hard samples. Furthermore, errors in the conventional method in-liquid indentation measurement are also caused by the difference of the hydrodynamic force exerting on the cantilever for the soft specimen and that for the hard sample, as the hydrodynamics force depends on the cantilever deflection amplitude and the force load frequency. Moreover, these fundamental limits of the existing conventional indentation measurement cannot be readily addressed through hardware improvement.

SUMMARY OF THE INVENTION

The present system provides a control-based indentation measurement approach to overcome limits of the conventional method. The cantilever dynamics is modeled and analyzed for broadband and in-liquid nanomechanical measurements. Particularly, the model accounts for the relationship between the measurement frequency range and the bandwidth of the piezo actuator and the cantilever. The analysis of the cantilever dynamics model reveals the fundamental limits of the conventional method for both broadband and in-liquid nanoindentation measurements. Based on the analysis, the indentation is measured from the difference of the cantilever base displacement on the soft sample and that on the reference sample. The precision tracking of the cantilever deflection is achieved by using control techniques, for example, the Model-less Inversion-based Iterative Control (MIIC) technique. The present method is illustrated through the broadband and the in-liquid indentation measurements of a PDMS sample in experiments.

DESCRIPTION OF THE DRAWINGS

The foregoing summary and the following detailed description of the preferred embodiments of the present invention will be best understood when read in conjunction with the appended drawings, in which:

FIG. 27 is a graph illustrating comparisons of elastic modulus vs. load rate for different cells.

DETAILED DESCRIPTION

Figure 1B:
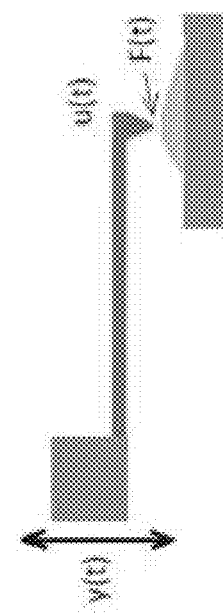
FIG. 1(b) is a diagrammatic view of a model of a cantilever of the AFM illustrated in FIG. 1(a) during an indentation measurement.
Figure 1A:
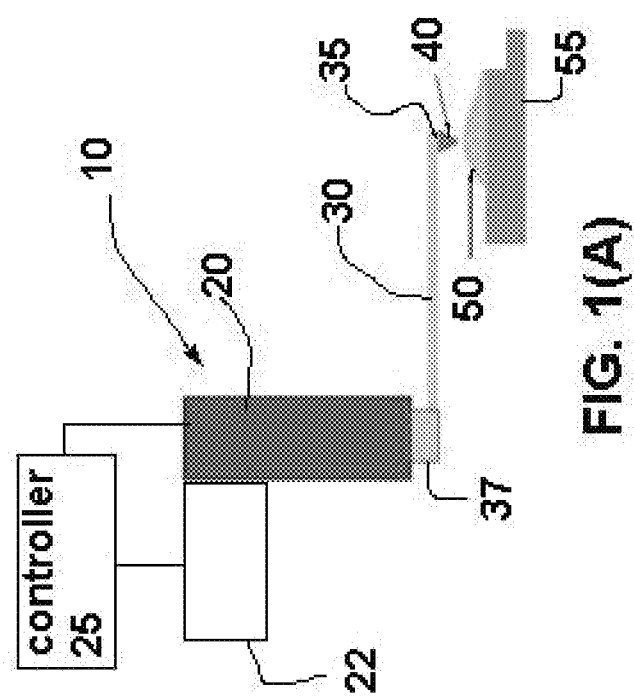
FIG. 1(a) is a diagrammatic view of a nanomechanical measurement using atomic force microscope.

Referring now to FIGS. 1(a) and 1(b), a schematic diagram of an atomic force microscope (referred to as an "AFM") is designated generally 10. The AFM 10 is operable to measure material properties and/or interaction force at nanoscale. The AFM is capable of applying force of desired value (as small as piconewton) at a desired location, and measuring the properties'/force at that location, e.g., the force-distance curve measurement. Specifically, as shown in FIG. 1(a) the AFM 10 comprises a micro-fabricated cantilever beam 30 with a nanometer size probe 40 on the free end. The beam is driven by a piezo-actuator 20 that displaces the beam towards the sample and then retraces away from the sample 50 surface under a constant force load/unload rate, e.g., a triangle force load/unload trajectory. The actuator 20 displaces the beam 30 along the z-direction, which in the perspective of FIG. 1A is the vertical direction.

A deflection sensor 35 detects the deflection of the cantilever beam 30 during the process. In particular, the sensor 35 detects the magnitude of displacement in the z-axis direction. A controller 25 controls the z-axis actuator in response to data from the deflection sensor 35. In the present instance, the controller controls the z-axis actuator according to an iterative process as discussed further below. Additionally, the system may include an x-axis actuator 22 for displacing the beam 30 in a lateral direction transverse the direction of the z-axis actuator 20. Similarly, the system may include a sensor 37 for detecting the x-axis displacement.

During the push and retrace process of the cantilever, the applied force and the indentation generated (i.e., the deformation of the sample surface caused by the applied force) are measured. The force applied is measured by the deflection of the cantilever 30 free end. The indentation, however, is not measured directly. Rather, the force-distance curve measured on a reference hard sample (e.g. a silicon sample) with stiffness several orders higher (than that of the soft sample 50) is employed to quantify the indentation. Therefore, the applied force and the indentation generated are the two variables to be accurately measured in nanomechanical property characterization using AFM. The accuracy of the indentation measurement relates to the nanomechanical properties of the soft sample to be measured. The nanomechanical properties of soft sample are obtained by applying the measured interaction force and indentation results to a chosen contact mechanics model of the probe-sample interaction. For example, when the deformation is small and the adhesion force is negligible, the creep compliance of the sample J(t) can be obtained by using the Hertzian model:

$$y^{\frac{3}{2}}(t) = C_1 \int_0^t J(t-\tau)\dot{F}(\tau)d\tau. \quad \text{Equation 1}$$

where F(t) is the tip sample interaction force, y(t) is the indentation, J(t) is the creep compliance of the test material in uniaxial compression, and $C1=[3(1-v^2)]/(4\sqrt{R})$ where R is the tip radius and v is the poisson ratio of the test sample. From Eq. (1) it can be seen that the errors in the indentation measurement directly result in the errors in the measured mechanical properties of the soft sample.

Precision tracking of periodic trajectory at high-speed is desirable in applications such as nano-scale imaging/measurements using atomic force microscope (AFM). Specifically, in atomic force microscope imaging, repetitive precision scanning at high-speed is desirable to achieve high-speed imaging, which not only improves the throughput, but more importantly, enables the interrogation of nanoscale dynamic processes.

A. Control-Based Approach to Nano-Indentation Measurement of Soft Materials in Air The present system 10 provides a control-based approach operable to address limits of the conventional method for broadband and in-liquid indentation measurements. When measuring the nanomechanical properties of soft samples in air, frequently the measurement frequency range is below a few kHz, which may be 10-20+ times smaller than the first resonant frequency of the cantilever used. Referring to FIG. 1, such a frequency separation implies that the cantilever dynamics is not excited during the indentation measurement. This provides a first assumption: that the cantilever beam behaves as a rigid beam. Furthermore, during nanomechanical property measurement using an AFM, a static preload force of larger magnitude (at least 2-3 times larger) may be applied along with the dynamic excitation force. Such a static preload force ensures that a continuous probe sample remains in contact throughout the push-retrace (i.e. load/unload) process, and the tip-sample interaction force is dominated by the electrostatic repulsive force. This leads to a second assumption: continuous and stable contact is maintained between the probe and the sample when cantilever deflection is measured.

Moreover, a third assumption is based on the relative displacement of the cantilever at the free-end (with respect to the fixed-end) being 2 or more orders smaller than the length of the cantilever (in the range of 100-300 μm). Thus the relative motion of the cantilever at the free-end, Lθ can be accurately measured by the vertical deflection at the free-end, i.e., $$L \sin \theta \approx L\theta \approx z_b - z_e = d \qquad \text{Equation 2}$$

where L is the cantilever length, $z_b$ and $z_e$ are the displacements of the cantilever at the fixed end and the free end respectively, and θ is the ending angle of the cantilever free end relative to its fixed end and d is the measured cantilever deflection.

A fourth assumption is that cross-axis coupling between the z-axis and the x-axis on the vertical motion of the cantilever is negligible. A fifth assumption is the cantilever base displacement $Z_b$ can be accurately measured.

Figure 2:
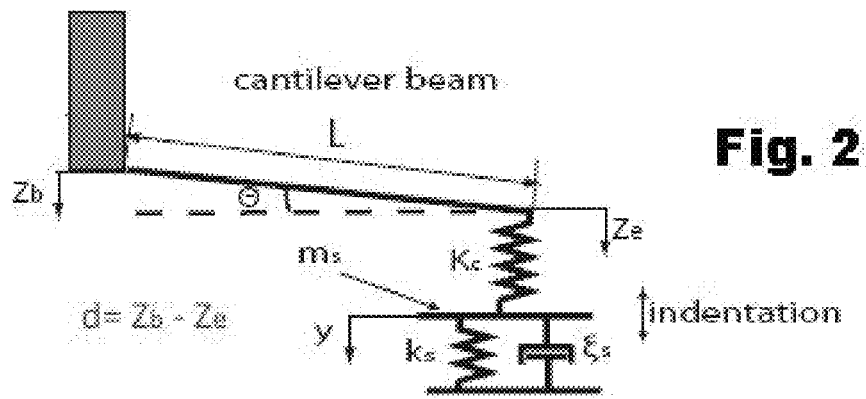
FIG. 2 is a simplified diagrammatic model of AFM tip-sample dynamics for a soft sample.
Figure 3:
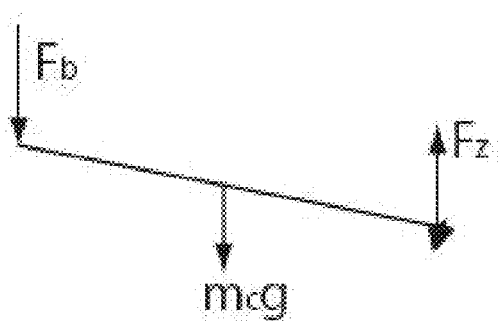
FIG. 3 is a free body diagram of the AFM cantilever beam illustrated in FIG. 1(a)

Based on the first two assumptions and referring to FIGS. 2-3, the repulsive tip-sample interaction can be captured in a spring-damper model with the cantilever reaction force $F_z$ described as:

$$F_z(t)=k_c(z_{es}(t)-y_s(t)) \qquad \text{Equation 3}$$

Where $k_c$ is the stiffness of the cantilever beam and $z_{es}$ and $y_s$ are the cantilever displacement at the free end and the indentation in the soft sample, respectively.

Based on the second and third assumptions above, the equation of motion (EOM) of the cantilever beam during the nanomechanical measurement on soft sample in air can be represented in terms of the deflection d and the indentation $y_s$ as $$\frac{1}{L}J\ddot{d}_s(t) = \frac{L}{2}m_c g - Lk_c(z_{bs}(t) - d_s(t) - y_s(t)) \qquad \text{Equation 4}$$

where J and $m_c$ are the mass moment of inertia of the cantilever beam relative to the fixed end and the effective mass of the cantilever respectively. Also, the relation between the indentation and the sample properties can be described by using the force balance at the contact point as $$m_s\ddot{y}_s(t)=k_c(z_{bs}(t)-d_s(t)-y_s(t))-k_s y_s(t)-\xi_s \dot{y}_s(t) \qquad \text{Equation 5}$$

where $m_s$ is sample mass involved in the tip-sample interaction, and $k_s$ and $\xi_s$ are the equivalent spring constant and damping coefficient of soft sample in interaction, respectively (see FIG. 2).

Figure 4:
FIG. 4 is a diagrammatic view of the cantilever beam

For the hard reference sample used in the indentation measurement, the indentation becomes negligible compared to that on the soft sample as the elastic modulus of the hard sample (such as silicon) is over several orders higher than that of the soft sample to be measured, while the viscosity of the hard sample is negligible (i.e., in FIG. 2, the effective spring constant $k_s \to \infty$ and the effective damping coefficient $c_s \to 0$). Thus, referring to FIG. 4, the EOM of the cantilever beam during nanomechanical measurement on the hard sample is reduced to $$J\ddot{\theta}_h(t) = \frac{L}{2}m_c g - Lk_c z_{eh}(t) \qquad \text{Equation 6}$$

where the subscript "h" denotes the variable are with respect to the hard reference sample. The above EOM can also be rewritten in terms of the cantilever deflection $d_h$ and the cantilever base displacement $z_{bh}$ as $$\frac{1}{L}J\ddot{d}_h(t) = \frac{L}{2}m_c g - Lk_c(z_{bh}(t) - d_h(t)) \qquad \text{Equation 7}$$

Combining equations. (4) and (7) yields the indentation as:

$$y_s = (z_{bs}(t) - z_{bh}(t)) + (d_h(t) - d_s(t)) + \frac{1}{L^2 k_c}J(\ddot{d}_s(t) - \ddot{d}_h(t)) \qquad \text{Equation 8}$$

Thus, the cantilever dynamics model given in Eq. (8) can be used to explain the limits of the conventional indentation measurement method. As the same input voltage was applied to the z-axis piezo-actuator in the force measurements of both the soft and the hard samples, the motions of the piezo actuator in both cases are the same. As a result, the displacements of the cantilever base in both force-curve measurements are the same, $$z_{bs}(t)=z_{bh}(t) \qquad \text{Equation 9}$$

because the cantilever base is attached to the AFM peizo through a rigid fixture, and the cantilever base displacement is not affected by the tip sample interaction. When the force load rate is low (relative to the AFM z-axis piezo-dynamics and the resonant frequency of the cantilever beam), the velocity of the cantilever at the free end (i.e., the deflection measured) and that at the base are equal to each other. Combining with Eq. (9) this implies that the velocity of the force (i.e., the force load rate) applied to both the soft sample and that to the hard one are very close to each other. As a result, the acceleration of the cantilever deflection measured on the soft sample and that on the hard one are also very close to each other, i.e., $$\ddot{d}_s(t) \approx \ddot{d}_h(t) \quad \text{Equation 10}$$

Applying this condition along with Eq. (9) to Eq. (8) yields $$y_s(t)=(z_{bs}-z_{bh})+(d_h-d_s)=d_h(t)-d_s(t) \quad \text{Equation 11}$$

i.e., the indentation in the soft sample is given by the difference of the cantilever deflection on the hard sample and that on the soft one—the conventional indentation measurement method is valid when the force load rate is low and/or the measurement frequency range is in the low region.

The conventional method to indentation $\ddot{d}_s(t) \neq \ddot{d}_h(t)$ measurement, however, breaks down as the force load rate increases and approaches the resonant frequency of the z-axis dynamics of AFM. When the force load rate is close to the resonance of the z-axis dynamics, probe sample contact dynamics change due to the frequency dependent properties of the soft sample (i.e., $k_s$ and $\xi$ would change in Eq. (5)). Therefore, the same control input (used in the measurement of soft sample) won't result in the same force load acceleration (i.e., the same cantilever deflection acceleration) on the reference sample because the change of sample would cause the deflection change resulted from the convolution effects between property of the soft sample and the AFM tip motion, i.e., and Eq. (8) indicates that $$y_s(t) = [d_h(t) - d_s(t)] + \frac{1}{L^2 k_c} J[\ddot{d}_s(t) - \ddot{d}_h(t)] \neq d_h(t) - d_s(t), \quad \text{Equation 12}$$

Accordingly, a control-based approach to accurately measure the indentation of soft sample at high-speed (or broadband) in air is provided. More specifically, control techniques are utilized to ensure precision tracking of the same desired cantilever deflection trajectory on both the soft and the hard reference samples, i.e., $d_s(t)=d_h(t)$ ∀t during the measurement. Applying this equivalence to Eq. (8) yields, $$y_s(t)=z_{bs}(t)-z_{bh}(t) \quad \text{Equation 13}$$

Thus, in the proposed method, the indentation is obtained from the difference of the cantilever base displacement on the soft sample and that on the hard reference one when the same desired force load (i.e., the same cantilever deflection) is accurately tracked on both the soft and hard samples. The accurate tracking of the desired force load profile will be achieved by using control techniques to account for the dynamics, hysteresis and other adverse effects of the piezo-cantilever actuation system (from the input voltage to the piezo actuator to the cantilever deflection as the output), as discussed further below. The implementation of the above described method relies on Assumption 4 and Assumption 5. These two Assumptions hold when the measurement frequency range is low (compared to the AFM piezo dynamics), but may become questionable as the measurement frequency range increases. Therefore, a control-based approach is provided to account for the measurement issues when these two Assumptions are relaxed.

B. Compensation for the Lateral-Vertical Cross-Coupling

Figure 5:
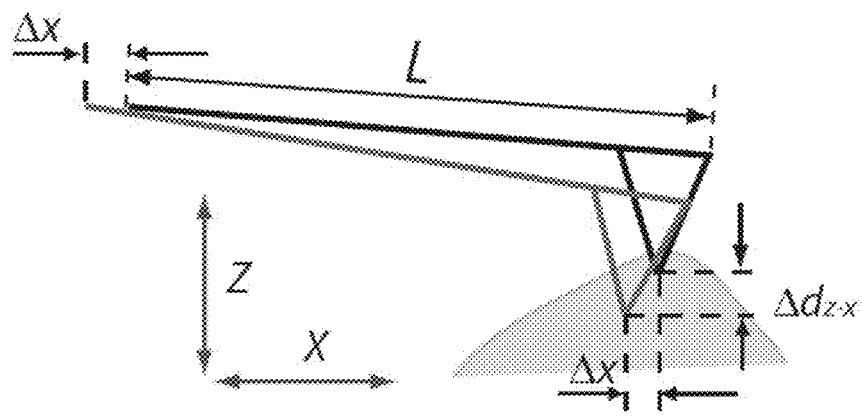
FIG. 5 is a diagrammatic view illustrating motion of the cantilever tip during indentation process of a soft sample.

Assumption 4 is then relaxed and the coupling caused effects on the soft sample are accounted for, because indentation measurement error can be induced by the lateral-vertical cross-axis coupling of the piezo-actuators. Lateral motion of the x-axis piezo-actuator can be generated when a voltage is applied to drive the z-axis piezo actuator. The coupling caused lateral motion, in turn, results in unwanted vibration of the cantilever. Specifically, during the nanomechanical measurement (assuming Assumption 5 holds), the coupling caused lateral motion of the cantilever (i.e., the back and forward motion, see FIG. 5), albeit small, can induce additional variation of the contact angle and contact area of the cantilever probe on the sample surface. Due to the indentation of the probe and the resulting larger probe-sample contact area on the soft sample (than that on the hard one), the x-z cross axis coupling-caused contact angle and area changes are much more pronounced on the soft sample than on the hard reference, resulting in additional variations in the measured cantilever deflection. Additionally, the x-z cross-axis coupling-effect is small and becomes negligible when the measurement frequency is in the low frequency region (far below the first significant resonance of the AFM x-axis dynamics) as the amplitude of the vertical displacement of the cantilever (i.e., the amplitude of the z-axis piezo actuator displacement) tends to be small during the nanomechanical measurements, and thereby the x-axis coupling caused motion is small. The coupling-caused x-axis motion, however, becomes much larger when the measurement range moves to high-frequency region and the frequency components of the input voltage are high and close to the resonance of the x-axis dynamics. Therefore, the xz cross-axis coupling effect is compensated for during broadband nanomechanical measurement. In the presence of the x-z cross-axis coupling effect, the measured cantilever deflection on the soft sample $\hat{d}_s(t)$ is given by:

$$\hat{d}_s(t)=d_{s-z}(t)+d_{s-x}(t) \quad \text{Equation 14}$$

Where $d_{s-z}(t)$ and $d_{s-x}(t)$ are the cantilever deflections caused by the cantilever base displacement and x-z cross axis coupling effect, respectively. Thus, the above Eq. (14) implies that the indentation consists of both the part generated by the z-axis excitation force (corresponding to $d_{s-z}(t)$, and the part generated by the x-z cross axis coupling (corresponding to $d_{s-x}(t)$. As a result, the cantilever base displacement measurement, corresponding to the z-to-z cantilever deflection $d_{s-z}(t)$, is not employed in the proposed method described below to determine the indentation via Eq. (13).

To account for the effect of the additional cantilever deflection caused by coupling, the equivalent cantilever base displacement $\hat{z}_{bs}(t)$ is quantified such that with the absence of the coupling-caused vertical deflection $d_{s-x}(t)$, the corresponding cantilever deflection, (i.e., the $d_{s-z}(\cdot)$ in Eq. (14)), equals the measured cantilever deflection. The equivalent cantilever based displacement is quantified by first, quantifying the cross-coupling caused cantilever deflection, $d_{s-x}(\cdot)$, then secondly, using $d_{s-x}(\cdot)$ to find the corresponding cantilever base displacement, $z_{b,e}(t)$. In other words, $z_{b,e}(t)$ equals the cantilever base displacement that generates a cantilever deflection equal to $d_{z-x}(t)$. As discussed below, the cantilever base displacement can be regarded as the driving input to the cantilever deflection generated at the free end. Then the equivalent cantilever base displacement is obtained as $$\hat{z}_{bs}(t)=z_{b,e}(t)+z_{b-s}z(t) \quad \text{Equation 15}$$

And the indentation is obtained as:

$$y_s(t)=\hat{z}_{bs}(t)-z_{bh}(t) \quad \text{Equation 16}$$

Where $Z_{bh}(t)$ is the measured cantilever base displacement on the hard reference sample when the same desired cantilever deflection $d_d(t)$ is tracked i.e. when $\hat{d}_s(t)=d_h(t)=d_d(t)$ is satisfied.

To quantify the x-to-z coupling-caused variation of cantilever deflection in the vertical direction, $d_{s-x}$ (see Eq. (14)), the frequency response of the cross coupling dynamics with the cantilever lateral motion, $\Delta x$, is measured as the input and the resultant cantilever deflection change, $\Delta d_{z-x}$, as the output.

$$G_{x-z}(j\omega) = \frac{\Delta d_{z-x}(j\omega)}{\Delta x(j\omega)} \quad \text{Equation 17}$$

by applying an excitation input voltage of rich frequency components but small amplitude to the x-axis piezo actuator, and a constant voltage to the z-axis piezo actuator such that a stable probe-sample interaction is established with the interaction force dominated by the repulsive electrostatic force, and then measuring the cantilever vertical deflection (with the static pre-load part subtracted), ^ds(t), and the x-axis piezo displacement, $x_d(t)$. Thus, the cross-coupling caused cantilever deflection equals the measured deflection, ^$d_s(t) = \Delta d_{z-x}(t)$, and the measured x-axis piezo actuator displacement is also equivalent to the cantilever lateral motion $\Delta x$, i.e., $$\Delta x(t) = x_d(t) \quad \text{Equation 18}$$

Equation 18 holds because the cantilever can be treated as a rigid beam (according to Assumption 1), and because due to the applied constant preload, the cantilever bending caused lateral motion is negligible under this circumstance. Therefore, the lateral motion of the cantilever is a translational motion. Furthermore, to avoid the convolution effect of the x-axis piezo actuator dynamics, control techniques such as the MIIC technique are utilized so that the displacement of the x-axis piezo-actuator accurately tracks the desired frequency-rich trajectory (e.g., a band-limited whitenoise trajectory). The amplitude of the cantilever probe rotation (around the instant center of probe) in the lateral x-axis will be kept small at around 200 nm (with respect to that of the preload static force) so that the x-axis translational displacement of the center of the contact area of the cantilever probe is negligible. These conditions are enforced such that the measured x-to-z coupling dynamics accurately represents that presenting during the nanomechanical measurement.

Thus, for given cantilever deflection obtained during the nanomechanical measurement, the cross-coupling caused part, $d_{s-x}(t)$, can be readily quantified as $$d_{s-x}(j\omega) = G_{x-z}(j\omega) x_{d,m}(j\omega) \quad \text{Equation 19}$$

where $x_{d,m}(j\omega)$ is the x-axis piezo displacement measured during the nanomechanical measurement. Therefore, the measured cantilever base displacement $z_b s(j\omega)$ is related to the cantilever deflection by $$z_{bs}(j\omega) \to d_s(j\omega) - d_{s-x}(j\omega) \quad \text{Equation 20}$$

and the equivalent cantilever base displacement (corresponding to the measured cantilever deflection ^$d_s(j\omega)$) is quantified as:

$$\hat{z}_{bs}(j\omega) = \frac{d_s(j\omega)}{d_s(j\omega) - d_{s-x}(j\omega)} z_{bs}(j\omega) \quad \text{Equation 21}$$

C. Compensation for the Dynamics Effect on the Cantilever Base Displacement Measurement By relaxing Assumption 5 the scenario can be considered in which accurate measurement of the cantilever base displacement over the entire measurement frequency is not available. It is noted that when the measurement frequency is relatively low (i.e., much lower than the first resonance of the cantilever), the cantilever base displacement can be accurately measured by the displacement sensor of the z-axis piezo actuator (called z-axis sensor below). In other words, under Assumptions 1,2, the z-sensor measurement is proportional to the cantilever deflection signal during the nanomechanical measurement on a hard reference sample so that $g_c$ is constant. Therefore, $$z_b(j\omega) = z_{sen}(j\omega), \text{ and} \quad \text{Equation 22}$$

$$g_c = \frac{d_h(j\omega)}{z_{sen,h}(j\omega)}, \text{ when } \omega \ll \omega_c$$

where $z_{sen}(j\omega)$ is the measured z-axis sensor signal, and $\omega_c$ is the first resonant frequency of the cantilever, and practically we can regard the mapping of cantilever base to cantilever deflection as a constant when $\omega \ll \omega_c$—Assumption 1. Under such a condition, the cantilever base displacement $z_{bh}(j\omega)$ can be accurately measured by the z-axis sensor signal $z_{sen,h}(j\omega)$.

As the measurement frequency increases to high frequency region, the dynamics of the mechanical fixture connecting the lower end of the z-axis piezo actuator (where the z-sensor is located) to the cantilever base can be excited, i.e., $$z_{sen}(j\omega) \neq z_b(j\omega), \text{ when } \omega \to \omega_{f,c} \quad \text{Equation 23}$$

where $\omega_{f,c}$ is the first resonance of the mechanical fixture. As a result, the cantilever base displacement zb(t) is not accurately measured by the z-sensor $z_s(t)$ directly in broadband nanomechanical measurements.

The methodology described above implies that accurately measuring the cantilever base displacement is important in quantifying the frequency response of the mechanical fixture of the cantilever, $G_m(j\omega)$. However, $G_m(j\omega)$ may be quantified experimentally by measuring the frequency response from the z-sensor signal to the cantilever deflection on a hard reference sample, i.e., from $z_{sh}(j\omega)$ to $d_h(j\omega)$, such as, $$G_{mc}(j\omega) = G_m(j\omega) G_c(j\omega) = \frac{d_h(j\omega)}{z_{sen,h}(j\omega)} \quad \text{Equation 24}$$

where $G_c(j\omega)$ is the frequency response from the cantilever base displacement to the cantilever deflection. By Assumption 1, however, the frequency response of the cantilever can be represented as a constant during the considered nanomechanical measurement, i.e., $$G_c(j\omega) = g_c, \text{ for } \omega \leq \omega^*_m \quad \text{Equation 25}$$

where $\omega^*_m \ll \omega_c$ is the upper limit of the measured frequency range (Note $\omega^*_m$ can be larger than $\omega_{f,c}$). Thus, the mechanical fixture dynamics $G_m(j\omega)$ can be obtained by substituting Eq. (25) into Eq. (24) to cancel the cantilever gain constant $g_c$.

Note that the above experimentally quantified cantilever fixture dynamics $G_m(j\omega)$ should be cantilever and sample independent. Because the cantilever dependent term $g_c$ is cancelled, the cantilever behaves as a rigid beam, and the indentation on the hard sample is negligible (see the demonstration of the experiment results shown further below).

Thus, for a given z-axis piezo actuator displacement measured during the nanomechanical measurement, the corresponding z-axis cantilever base displacement zb(t) can be obtained with the cantilever fixture dynamics as $$Z_b(j\omega) = G_m(j\omega) z_{sen}(j\omega), \quad \text{Equation 26}$$

D. Inversion-Based Iterative Control to Precision Cantilever Deflection Tracking From the above discussion, the proposed indentation measurement utilizes precision tracking of the same desired deflection profile on both the soft and the hard reference samples. This is accomplished using the modeling-free inversion-based iterative learning control (MIIC). Iterative learning control is an open-loop control that attempts to improve the tracking of a system executing a repeated task under similar conditions. The input to the system is updated iteratively to improve the accuracy of the desired motion. In the present instance, an MIIC method is used to achieve precision tracking of the cantilever deflection in broadband (nanomechanical) measurement.

Figure 6:
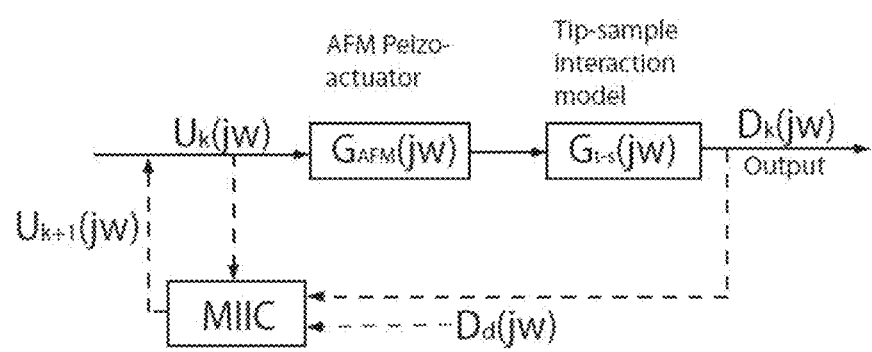
FIG. 6 is a block diagram of an MIIC technique for achieve tracking of the desired force profile for indentation measurement in air.

Specifically, the control input signal applied to drive the AFM z-axis piezo is obtained iteratively as follows (see FIG. 6):

$$U_{k+1}(j\omega) = \frac{U_k(j\omega)}{D_k(j\omega)} D_d(j\omega) \qquad \text{Equation 27}$$

where $D_d(j\omega)$ is the desired output trajectory (e.g., the desired cantilever deflection), and $U_k(j\omega)$ and $D_k(j\omega)$ are the current input (e.g., the input voltage to the corresponding piezo actuator) and output signals (e.g., the cantilever deflection) in the $k^{th}$ iteration, respectively. The MIIC law can be implemented directly to the indentation measurement in air as both the thermal drift and the hydrodynamic force effects are negligible. The repetitive nature of the indentation measurement provides an accurate method for tracking the desired cantilever deflection. Specifically, the MIIC technique does not require modeling of the system dynamics. Instead, the use of the system dynamics knowledge is embedded in the iterative process through the use of the measured input and output data.

EXAMPLE 1

An indentation measurement approach was implemented to measure the indentation on a polydimethylsiloxane (PDMS) sample both in air and in liquid.

A. Experiment Setup

The experiments used a state-of-the-art AFM (Dimension Icon, Bruker AXS Inc.). The AFM provided direct access to both the drive of the piezo actuators and the raw cantilever deflection sensor signals. The AFM included a z-axis piezo actuator for driving a probe having a cantilever. A deflection sensor detected the deflection of the cantilever beam during the process. A controller controlled the z-axis actuator in response to data from the deflection sensor. The control and sensor signals were acquired through a data acquisition system under the Matlab xPC-target environment. The Matlab xPC-target package was also used to implement the MIIC technique along with the PI-feedback controller. The probe used in the experiment was a silicon nitride probe having a soft silicon nitride cantilever beam with a silicon nitride tip. Specifically, the probe was model no. DNP-10 of Bruker AFM Probes and the same probe was used in all the indentation measurements. The first resonant frequency of the cantilever was above 50 KHz (see the specifications of the probe in Table 1). The width and the length of the cantilever were at 120 μm and 25 μm, respectively, and the measurement frequency range was within 6 kHz, the amplitude of the cantilever vibration during the following nanomechanical measurements was within 60 nm, and the measurement frequency range was within 3 kHz, the dynamics of the cantilever was not excited during the experiments.

TABLE I

THE SPECIFICATION OF THE AFM-PROBE USED IN THE EXPERIMENTS

| Geometry | Triangular | Tip Radius | 20 nm |
|---|---|---|---|
| Spring Constant | 0.3221 N/m | Tip Height | 6 μm |
| Length | 120 μm | Thickness | 0.6 μm |
| Width | 25 μm | Resonant Frequency | 71.3 kHz |

In the experiments, the initial conditions were maintained substantially the same by using the same probe and applying a preload force (56 nN) to both the PDMS sample and the silicon sample. Note that with the force load used in the experiment, the plastic deformation of the PDMS sample can be ignored. Furthermore, to reduce the flexibility of the connection between the cantilever and the AFM scanner, the cantilever was glued to the holder using wax.

Figure 7:
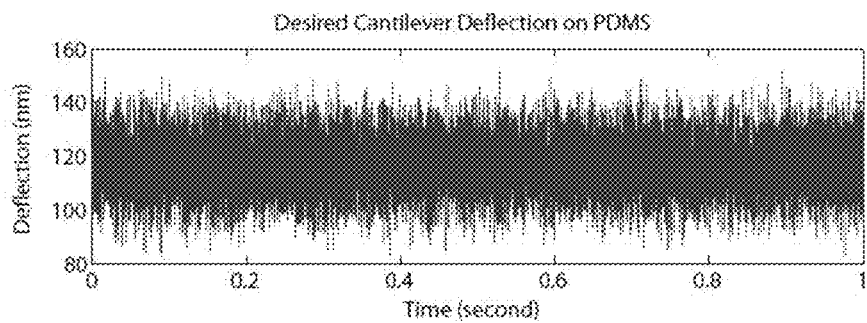
FIG. 7 is a graph showing the desired cantilever deflection displacement on a PDMS sample.
Figure 8:
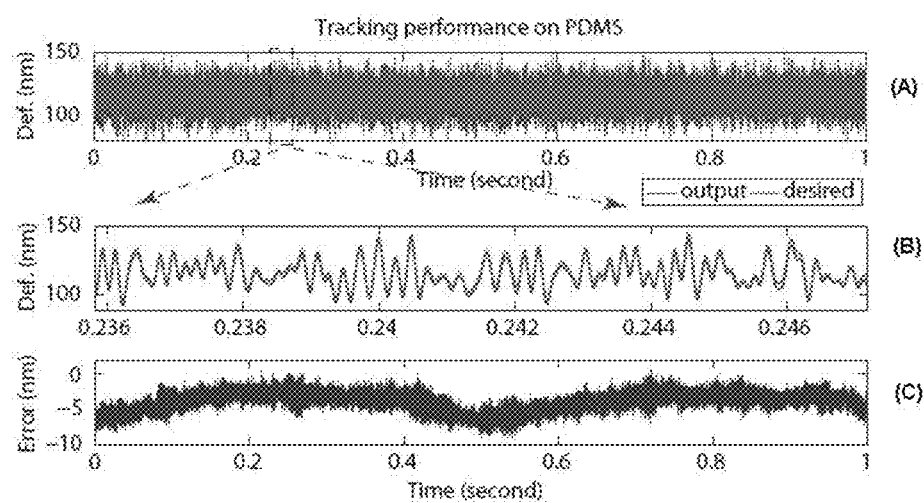
FIG. 8(A) is a graph showing the cantilever deflection tracking results measured on the PDMS sample in air.
FIG. 8(B) is a graph showing a magnified view of FIG. 7(a) illustrating the tracking results for 0.02 sec.
FIG. 8(C) is a graph showing the tracking error for the example of tracking the cantilever displacement on a PDMS sample.

B. Limits of the Conventional Broadband Indentation Measurement: Experimental Investigation To demonstrate the limits of the conventional indentation measurement method, the broadband indentation in the PDMS sample was obtained experimentally by using the conventional method. A band-limited white noise with frequencies ranging from 100 Hz to 6,000 Hz and average amplitude at 40% of the preload force was chosen as the desired cantilever deflection trajectory (i.e., the desired force profile). During the measurement, tracking of the desired cantilever deflection displacement (see FIG. 7) on the PDMS sample was obtained by using the MIIC technique (see FIG. 6). The drive input voltage that achieved precision tracking on the PDMS sample (the 2-norm tracking error of the cantilever deflection was smaller than 3%) was then applied to the nanomechanical measurement on the silicon sample. The deflection tracking results obtained in the experiments (after iterations) are shown in FIG. 8 for the PDMS sample. By the conventional method (see Eq. (11)), the indentation was quantified from the difference between the cantilever deflection on the PDMS sample and that on the silicon sample, as shown in FIG. 9.

The results demonstrated the limits of the conventional method to broadband nanomechanical measurement due to the various effects discussed above. With the bandlimited white noise applied (see FIG. 8), it is expected that due to the viscoelasticity of PDMS, the indentation generated, when viewed in the frequency domain (e.g., power spectrum), monotonically decreases with the increase of excitation frequency, signaling the increase of storage modulus of PDMS with the increase of frequency. Although the indentation measured by using the conventional method decreased with the increase of excitation frequency in the low frequency region (below ~600 Hz in FIG. 9), large "crests" and "troughs" appeared as the frequency increased. These "crest" and "troughs", therefore, were measurement errors that were induced by the conventional indentation method in broadband nanomechanical measurement.

To clarify and distinguish the causes of the measurement-error induced "crests" and "troughs" in the indentation plot obtained by using the conventional method, the frequency responses were measured for (1) the z-axis piezo dynamics, (2) the cantilever lateral motion during the nanomechanical measurement (e.g., the x-axis sensor signal), and (3) the cantilever mechanical fixture dynamics.

Figure 9:
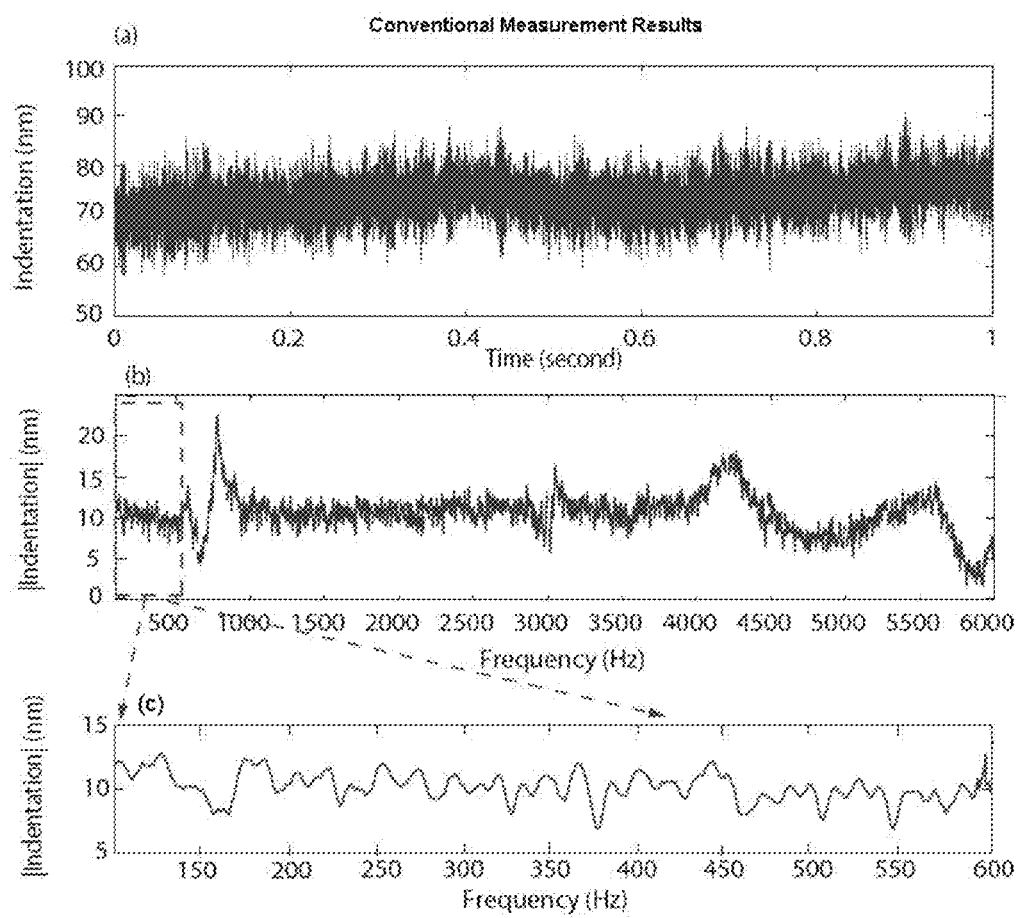
FIG. 9(A)-(B) are graphs illustrating the indentation in PDMS samples measured by using conventional method: (A) in the time domain; (B) in the frequency domain; and (C) a magnified view illustrating the frequency domain up to 600 Hz.
Figure 10A:
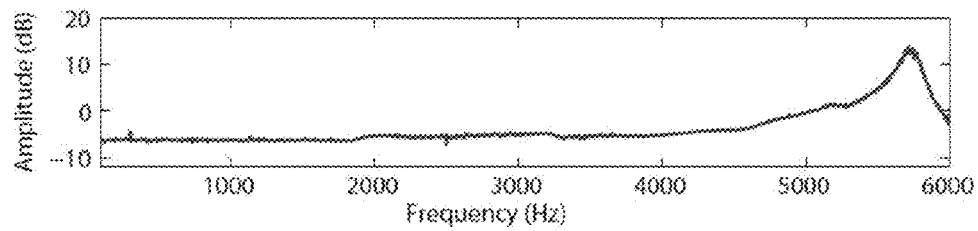
FIGS. 10(A)-(B) are graphs illustrating the measured frequency response of the AFM: (A) z-axis piezo-dynamics by taking the z-axis drive voltage and z-axis sensor voltage as input and output, and (B) cantilever lateral motion.
Figure 10B:
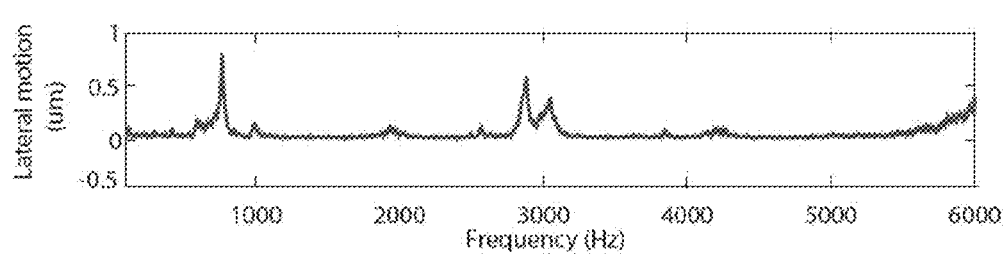
Figure 11:
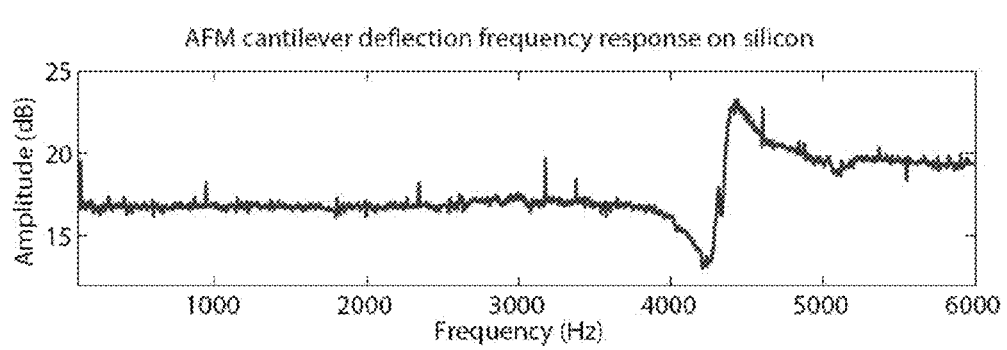
FIG. 11 is a graph illustrating AFM cantilever frequency response on silicon by taking the cantilever deflection and z-axis sensor signal as output and input.

The "crests" and "troughs" appeared in the indention measured by the conventional method in FIG. 9 were generated by the three effects discussed above. The pair of "crest-trough" combination around 5500 Hz in FIG. 9 has the same location as the "peak" of the z-axis piezo dynamics in FIG. 10(a), and the pair of "crest-trough" appeared around 715 Hz and the variation around 3000 Hz, which are also the locations of "spikes" of the cantilever lateral displacement (see FIG. 10(b)). The dynamics were also tested for the cantilever fixture dynamics connection between the AFM sensor the cantilever base by taking the z-axis sensor signal and cantilever deflection on the silicon sample as input and output (see FIG. 11). According to Assumption 1 and Eq. (20), the cantilever deflection on the hard sample is proportional to the base displacement. Therefore, the unflat portion in FIG. 11 represents the dynamics between the sensor and cantilever base. Here the frequency of this dynamics (FIG. 11) is the same as the second pair of "crest-trough" in FIG. 9 (both are in between 4000 kHz to 4800 kHz). Note that indentation is the response (output) of the material to the excitation force (input). These "crest-trough" combinations in the indentation were not due to the PDMS viscoelasticity behavior (as the viscoelasticity of polymers like PDMS, is over-damped—from dynamics viewpoint). Thus, the coincidences of "crests" and "troughs" were attributed to the AFM tip lateral motion coupling, dynamics of the mechanical connection, as well as the convolution effects between the PDMS sample and the AFM z-axis piezo dynamics, and these are limits of the conventional indentation method.

Figure 12:
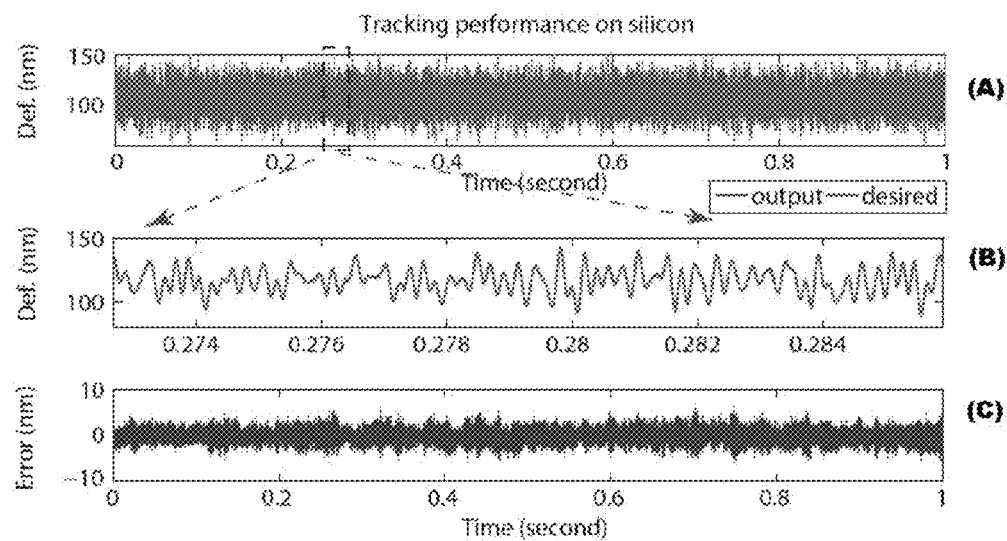
FIGS. 12(A)-(C) are graphs illustrating (A) the cantilever deflection tracking results measured on the silicon sample in air; (B) the zoomed-in view of the tracking results for 0.02 sec.; and (C) the tracking error.

C. Implementation of the Nano-Mechanical Measurement Method for Broadband In-Air Nano-Indentation The desired cantilever deflection profile used for conventional indentation measurement was chosen as the desired cantilever deflection trajectory. Tracking of the desired cantilever deflection displacement was also obtained by using the MIIC technique. The iteration process was terminated when the 2-norm tracking error could not be further reduced. The deflection tracking results obtained in the experiments (after iterations) are shown in FIG. 12 for the silicon sample. As shown in FIG. 12, the output substantially tracked the desired profile demonstrating that precision tracking of the desired cantilever deflection was achieved on both samples (the 2-norm tracking error was 2.76% for the silicon samples.). Such a precision tracking of the cantilever deflection on both the soft sample to be measured and the hard reference sample ensures the measurement accuracy of the indentation measurement method.

Figure 13:
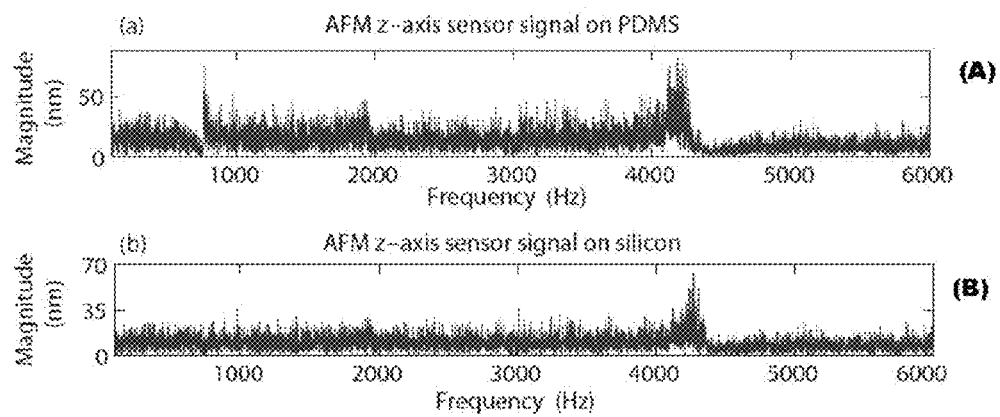
FIGS. 13(A)-(B) are graphs illustrating the AFM z-axis sensor signal measured on (A) the PDMS sample and (B) the silicon sample when the same desired cantilever deflection was tracked on both samples.
Figure 14:
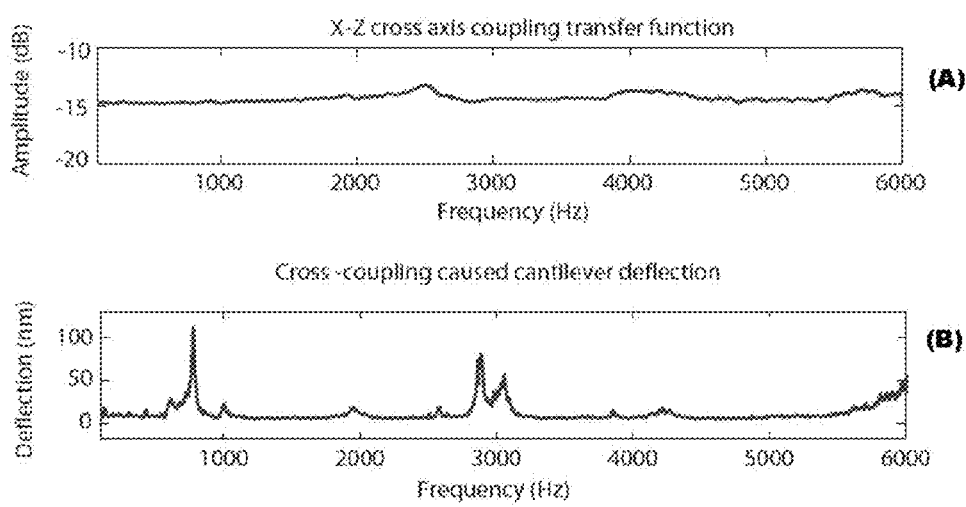
FIGS. 14(A)-(B) are graphs illustrating (A) The measured x-to-z cross axis coupling transfer function on PDMS and (B) x-z cross axis coupling caused cantilever deflection.

The z-axis displacement sensor was measured for quantifying the indentation, as shown in the frequency-domain in FIG. 13(a) and (b) for the silicon and the PDMS samples, respectively. The x-z cross axis coupling transfer function $G_{x-z}$ on the PDMS sample was obtained when the AFM x-axis piezo drive voltage was less than 10% of the preload (FIG. 14(a)), as a result, the cantilever deflection caused by x-z cross axis coupling effect was quantified by using Eq. (19) (see FIG. 10(b) for the measured cantilever lateral displacement), as shown in FIG. 14(b). Two different AFM probes were used (probe A is the one used for nanomechanical measurement) and two hard samples (silicon and sapphire) to obtain the connection dynamics $G_m$ (see Eqs. (21) and (25)).

Figure 15:
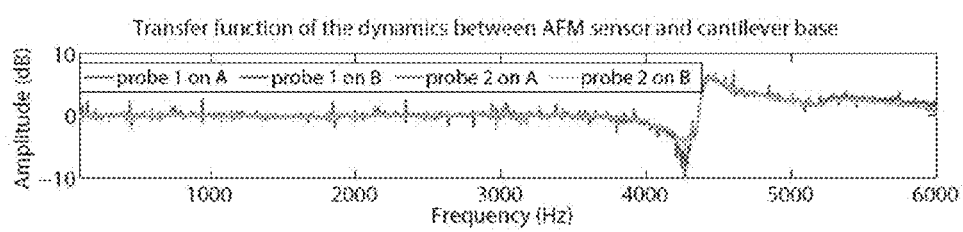
FIG. 15 is a graph illustrating the transfer function of the mechanical dynamics between AFM sensor and cantilever base measured by using probe 1 and 2 on sample A: silicon and sample B: sapphire.
Figure 16:
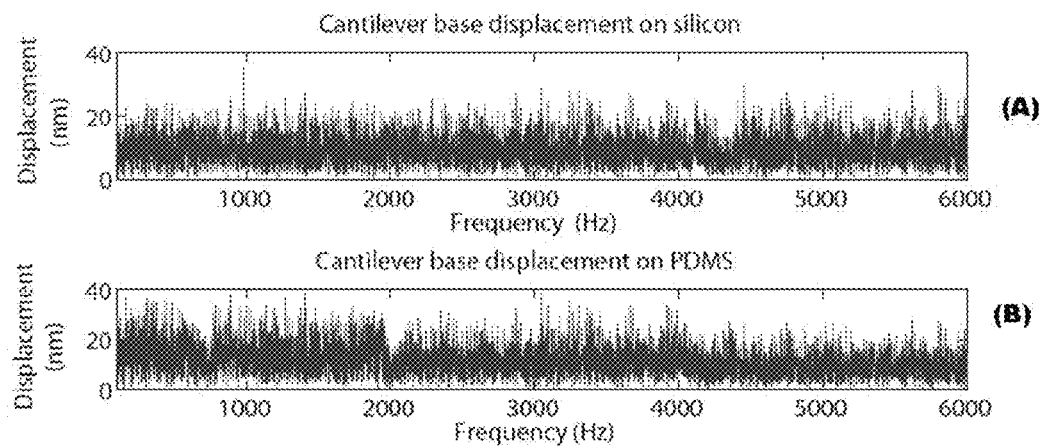
FIGS. 16(A)-(B) are graphs illustrating the cantilever base displacement (A) on silicon; (B) on PDMS.
Figure 17:
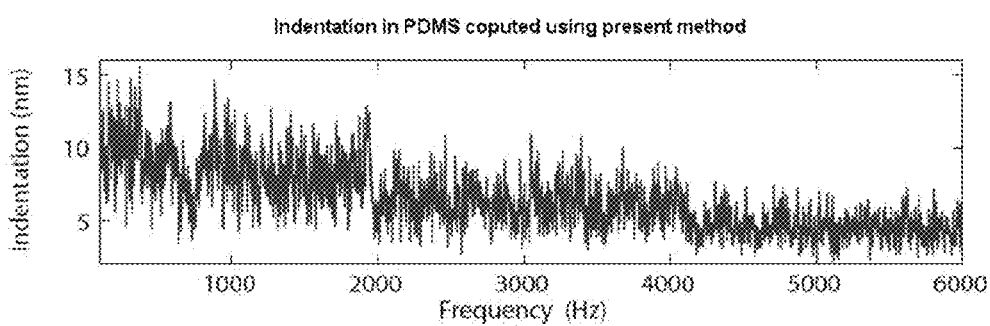
FIG. 17 is a graph illustrating indentation in the PDMS sample computed by using the present method.

As shown in FIG. 15, the results for both probes on both hard samples substantially overlie, demonstrating that the dynamics of the mechanical connection between the sensor and the cantilever base are independent of the cantilever. Then the cantilever base displacements (compensating for the cross axis coupling effect and mechanical connection dynamics) on the PDMS and the silicon sample were computed by using Eqs. (25) and (26), as shown in FIG. 16. The indentation (see FIG. 17) measured by using the present method was obtained from the difference of the base displacements (see Eq. (13)).

Figure 18:
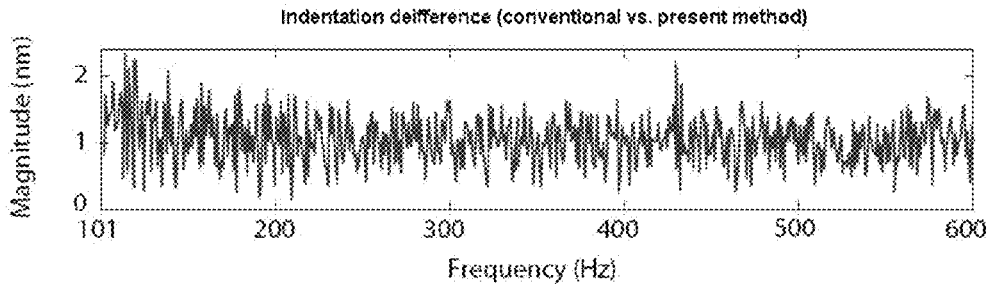
FIG. 18 is a graph of a comparison of Difference between the conventional measurement results and the indentation computed by using the present method in frequency range 101 Hz-600 Hz.

FIG. 18 shows the difference of the indentation obtained from the conventional method and the proposed measurement approach in the frequency range from 100 Hz-600 Hz (i.e., the results shown in FIG. 9). The 2-norm difference between the indentation obtained from the conventional measurement and the cantilever dynamics model as shown in FIG. 12 was 15.14% of the conventional measurement results. As indicated in FIG. 14(a) and (b), the cantilever lateral motion caused deflection change is less that 10 nm (since the lateral motion is less than 100 nm, and the gain between the deflection change and cantilever lateral motion is around 0.1), this value is less than 10% of the mean amplitude of measured deflection. Hence the cross axis coupling effect is negligible at this frequency range (100 Hz-600 Hz, compared with FIG. 8). Furthermore, the dynamics of the mechanical fixture and the AFM z-axis piezo are not exited. Therefore, both the conventional and the proposed methods are relative accurate estimations of the AFM cantilever-sample interaction system.

At high frequency range (up to 6 kHz), the experimental results (see FIG. 9(b) and (c)) demonstrated that the measurement frequency range in broadband nano-indentation measurement can be substantially increased by using the proposed indentation measurement method, and the proposed method is not limited by hardware dynamics. Different from the results obtained by using the conventional indentation measurement approach, the "crest-trough" combinations did not appear in the indentation plot measured by using the proposed technique (see FIG. 9(b) and (c)). Therefore, the experimental results demonstrated that the proposed technique (i.e., Eqs. (8) and (14)) can substantially reduce the limit of the AFM hardware on the broadband viscoelasticity measurement of soft materials using AFM. Although both the proposed cantilever dynamics model (Eq. (8)) and the proposed measurement approach (Eq. (13)) can be implemented to measure the nanoindentation, the computation time can be greatly reduced by using the proposed measurement approach.

As described above a computation scheme for nanoindentation measurement using MIIC on AFM is provided. When the cantilever tracks the same trajectory on different samples, the difference of cantilever base displacement is equivalent to the nanoindentation difference. The method is not limited by the AFM z-axis dynamics, and this improvement is supported by both theoretical analysis and the experimental results.

EXAMPLE 2

In another example. a control-based indentation and nano-mechanical measurement (CINM) technique were used to measure the viscoelasticities of four polymer samples. The CINM technique measures the indentation by, first, using advanced control technique to accurately track the same broadband excitation force (i.e., the same cantilever deflection) on both the soft specimen and a hard reference, and then, quantifying the indentation from the difference of the cantilever base displacements on the two samples. To accurately measure the cantilever base displacement, the adverse effects of the cantilever-fixture dynamics and the lateral-vertical cross-axis coupling effect are accounted for through a model-based experimental scheme. Thus, the CINM technique correcting, and thereby improving, the accuracy of indentation quantification.

The CINM technique for rapid broadband case uses the excitation force employed possesses a rich frequency spectrum (e.g., a band-limited white noise1). Particularly, the excitation force exerted after a stable probe sample interaction is established, and the indentation is measured by employing a hard reference sample (with stiffness over 3 orders higher than that of the polymers). Under the condition that the same desired excitation force is accurately tracked on both samples—by using advanced control technique, the indentation $y_s(t)$ is quantified directly in accordance with $y_s(t)=Z_{bs}(t)-Z_{bh}(t)$ wherein $Z_{bs}(t)$ and $Z_{bh}(t)$ are the cantilever base displacement measured on the soft sample and the hard sample respectively.

Accuracy of the CINM method relies upon the accuracy of the cantilever base displacement measurement. As discussed above, during broadband nanomechanical measurement, the method accounts for (a) the dynamics effect of the cantilever fixture (that connects the cantilever fixed end to the piezo actuator), and (b) the lateral-vertical cross-axis coupling. These effects are accounted for in the present instance as provided above in Equations 21-26.

Accordingly, the viscoelasticities of four polymer samples were measured by implementing the CINM technique on an AFM system (Dimension Icon, Bruker Nano Inc.). A sapphire sample was chosen as the hard reference. All the control and sensor signals were acquired/sent through a data acquisition system under the MATLAB xPC-target environment.

Figure 19:
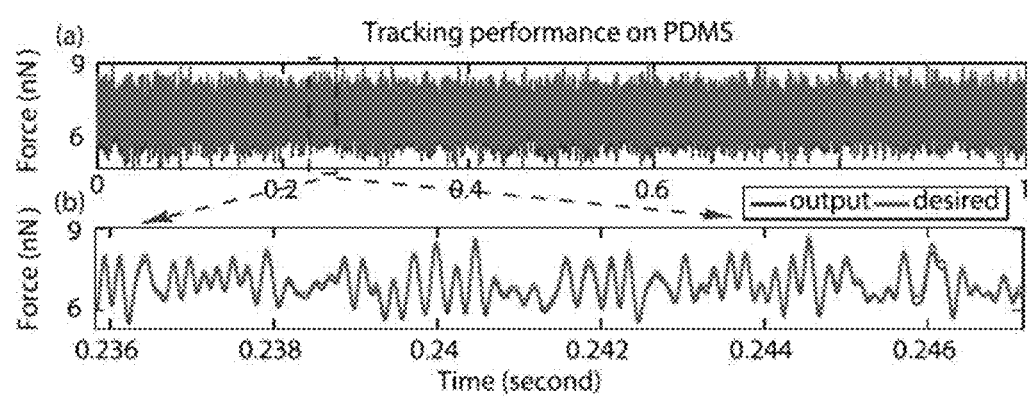
FIGS. 19(A)-(B) are (a) the cantilever vertical deflection tracking results on the PDMS sample, and (b) the zoomed-in view of the tracking results for 0.02 s.

The four polymer samples included one polydimethylsiloxane (PDMS) sample and three low-density polyethylene (LDPE) samples:

PDMS—mol. weight: 2100 g/mol; modulus: 2-5 MPa
LDPE 1—mol. Wgt: 0.87 g/cm$^3$; modulus: 4-5 Mpa
LDPE 2—mol. Wgt: 0.89 g/cm$^3$; modulus: ~70 Mpa
LDPE 3—mol. Wgt: 0.93 g/cm$^3$; modulus: ~450 Mpa During the nanomechanical measurement, a bandlimited white noise signal (frequency range: 100 Hz-6 kHz, duration: 1 s) generated in MATLAB (see FIG. 19) was chosen as the desired cantilever deflection. First, the MFIIC technique was implemented to track the desired cantilever deflection on all four samples and the sapphire. Iterations of MIIC were terminated when the tracking cannot be further improved (within 2-4 iterations). As an example, FIG. 19 shows the tracking performance on the PDMS sample, where the RMS tracking error is ~2:8%.

The nano-indentations $y_s(t)$ in the four testing samples were quantified by using the above CINM technique. Then, the complex modulus of the tested samples, $E^*(j\omega)$, were further obtained via Hertzian contact model by $$E^*(j\omega) = \frac{F(j\omega)}{2Ry_s(j\omega)}$$

where R=23:4 μm is the AFM tip radius calibrated experimentally.

Figure 20:
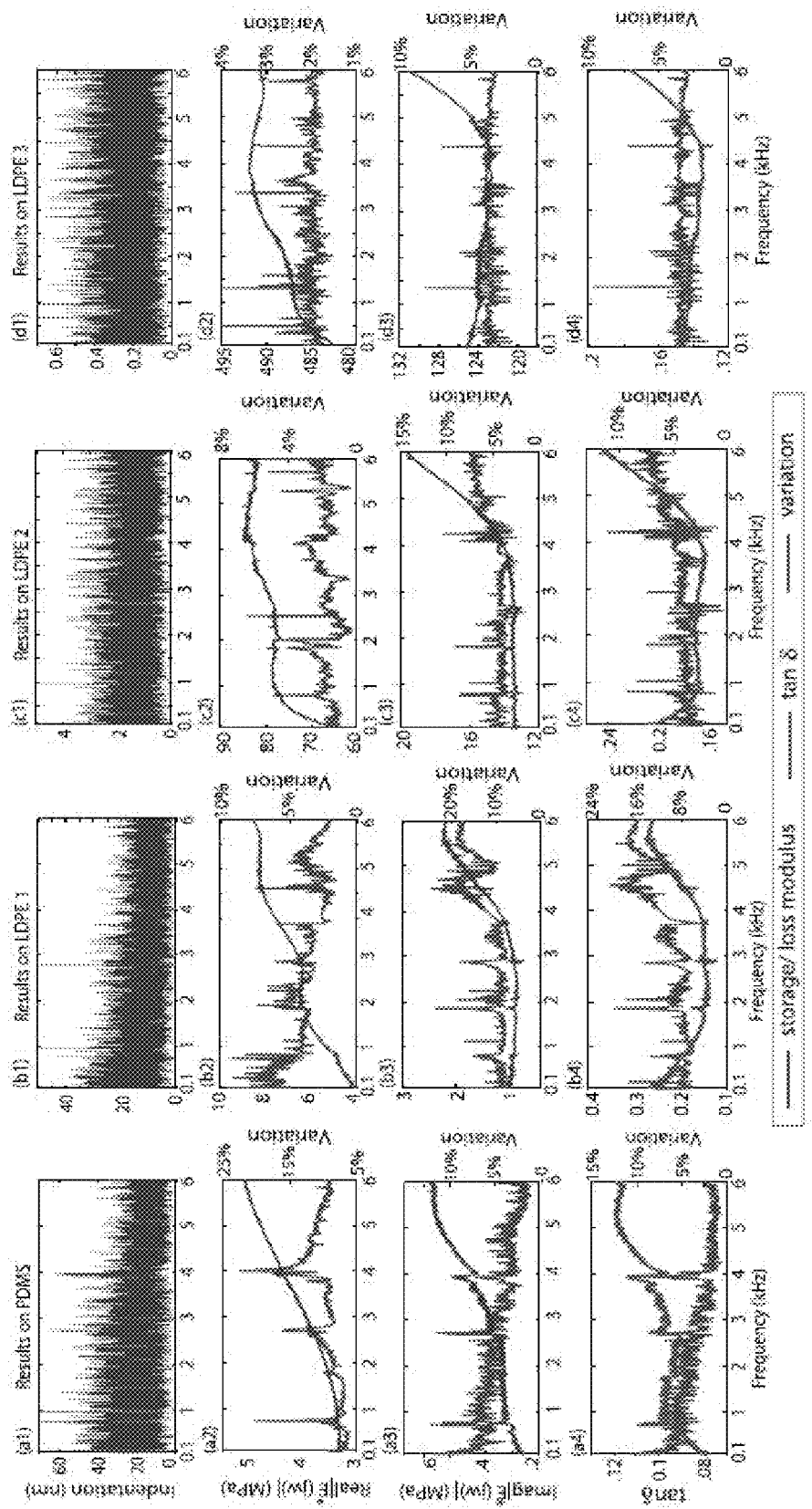
FIGS. 20(A1)-(D4) are experiment indentation, storage modulus, loss modulus, and loss tangent for (a1)-(a4) PDMS, (b1)-(b4) LDPE 1, (c1)-(c4) LDPE 2, and (d1)-(d4) LDPE 3.

The CINM technique was applied at five different locations on each sample under the same experimental condition. The measured indentation, the storage and loss moduli, and the loss tangent tan δ (the ratio of the loss modulus to the storage modulus) after averaging (over the five measurements at each frequency) are shown in FIG. 20, where the variation of the moduli and lost tangent is also shown (the variation was computed as the percentage of the maximum difference vs. the average value at each frequency).

The experimental results demonstrated the efficacy of the proposed CINM technique for rapid broadband nanomechanical measurement. The measured complex modulus of the four samples at low frequencies (100-200 Hz) compared well with the estimated values. There is no obvious "spike" in the indentation plots, thereby, no "spike" in the modulus plots as well. The measurement results are consistent as the RMS-variation of the modulus obtained was small, ranging from 1.2% to 16.5%.

Furthermore, the CINM technique clearly captured the rate dependent nature of viscoelasticity of the four samples. Specifically, as shown in FIG. 20, both the storage and loss moduli of each sample increased as the frequency increased, and the increasing trend of each sample agreed well with those reported for polymers of high molecular weight or high cross-link. The increase of loss modulus with the measurement frequency indicated an enhancement of polymer damping capacity at higher frequencies.

The detailed viscoelastic behavior of the four polymers were also obtained in kHz frequency region (up to 6 kHz) on AFM. Specifically, the loss tangent of PDMS increases slowly from 0.07 to 0.12 in measured frequency range (see FIG. 20($a4$)). This slow change of tan δ of PDMS shows that the low dielectric energy dissipation of this polymer is resistant to the change of load frequency, (tan δ increased from 0.03 at 10 Hz to 0.2 at 10 kHz).14 The plot of tan δ of LDPE 1 (with the lowest density) reveals three distinct viscoelastic regimes (see FIG. 20($b4$)): (1) the gradual decrease of tan δ at low frequencies (100 Hz to ~2 kHz) caused by stiffening of the polymer surface, due to the lesser amount of time available for molecular chain rearrangement; (2) the following flat portion of tan δ at medium frequencies (~2 kHz to 3.5 kHz) associated with the stabilizing of the molecular configuration produced in previous decrease of tan δ; and (3) the increase of tan δ at high frequencies caused by localized softening of amorphous phase, due to the greater amount of energy dissipation as the increase of loss modulus and free volume in the contact region. With the increase of mass density, the shape of tan δ plot changed substantially towards lower value for LDPE 2 and 3. Such a dramatic variation is caused by overall shift of the tan δ—frequency curve due to molecular changes, including change of crystallinity, molecular weight, and length of molecular chain. Furthermore, the results also suggested that higher density LDPE samples possessed higher resistance to loading frequency increase as the relative changes of tan δ for LDPE 2 and 3 over the measurement frequency range were much smaller than that of LDPE 1 (45.2% and 24.6% compared to 87.5%, respectively). Note that the temperature—frequency equivalence of viscoelasticities of polymers implies that the proposed technique can also be employed as an alternative approach to interrogate temperature dependence of nanomechanical properties of polymers 15—the bandlimited white-noise excitation shown in FIG. 19 draws strong similarity to the thermal vibration of materials over a broad range temperature variation. Moreover, this technique is readily to be applied to other soft materials, such as few-layer graphene. We expect that the measured frequency range (or equivalently, the accuracy of the indentation measured over a larger frequency range) can be substantially increased by using the proposed approach (care must be taken to minimize the substrate effect).

In summary, the experiment results demonstrated the efficacy of the CINM technique. The storage and loss moduli of the four polymers tested increased as the excitation frequency increased while the loss tangent showed the viscoelastic characteristics of each sample: tan δ of PDMS increased with the increase of the frequency; whereas tan δ of the 3 LDPE samples decreased first in the low frequency region then increased gradually as the frequency was above a couple of kHz.

EXAMPLE 3

In another example, a control-based approach was used for accurate indentation measurement of a living cell in a liquid. The approach includes (1) using a reference sample, such as a hard reference sample, and (2) tracking the same excitation profile on both the living cell and the reference sample. As discussed below, in the present instance, the process of tracking the same excitation profile is tracking the same cantilever deflection for both the lice cell and the reference sample.

Although the cantilever acceleration effect may be accounted for directly by using the measured cantilever deflection signal, significant uncertainties can be induced in such a measurement because of the difficulty in accurately calibrating and quantifying the inertia of the cantilever and the effective spring constant. Furthermore, such calibration is time consuming and subject to external disturbances. Accordingly, in the present example, the approach removes the cantilever acceleration effect. As the indentation becomes negligible on the hard reference sample (such as silicon with an elastic modules several order higher than that of a live cell), the dynamics of the cantilever during in-liquid probe-sample interaction are reduced.

Specifically, the deflection acceleration effect can be completely removed by accurately tracking the same desired cantilever deflection trajectory on both the live cell and the hard reference, so that the indentation $y_s(t)$ is related to the difference of the contribution of the hydrodynamic forces on the soft and hard samples, $F_{hs}(t)$ $F_{hh}(t)$ respectively by:

$$y_s(t) = z_{bs}(t) - z_{bh}(t) + \frac{(F_{hs}(t) - F_{hh}(t))}{k_{eqv}}$$

Figure 21:
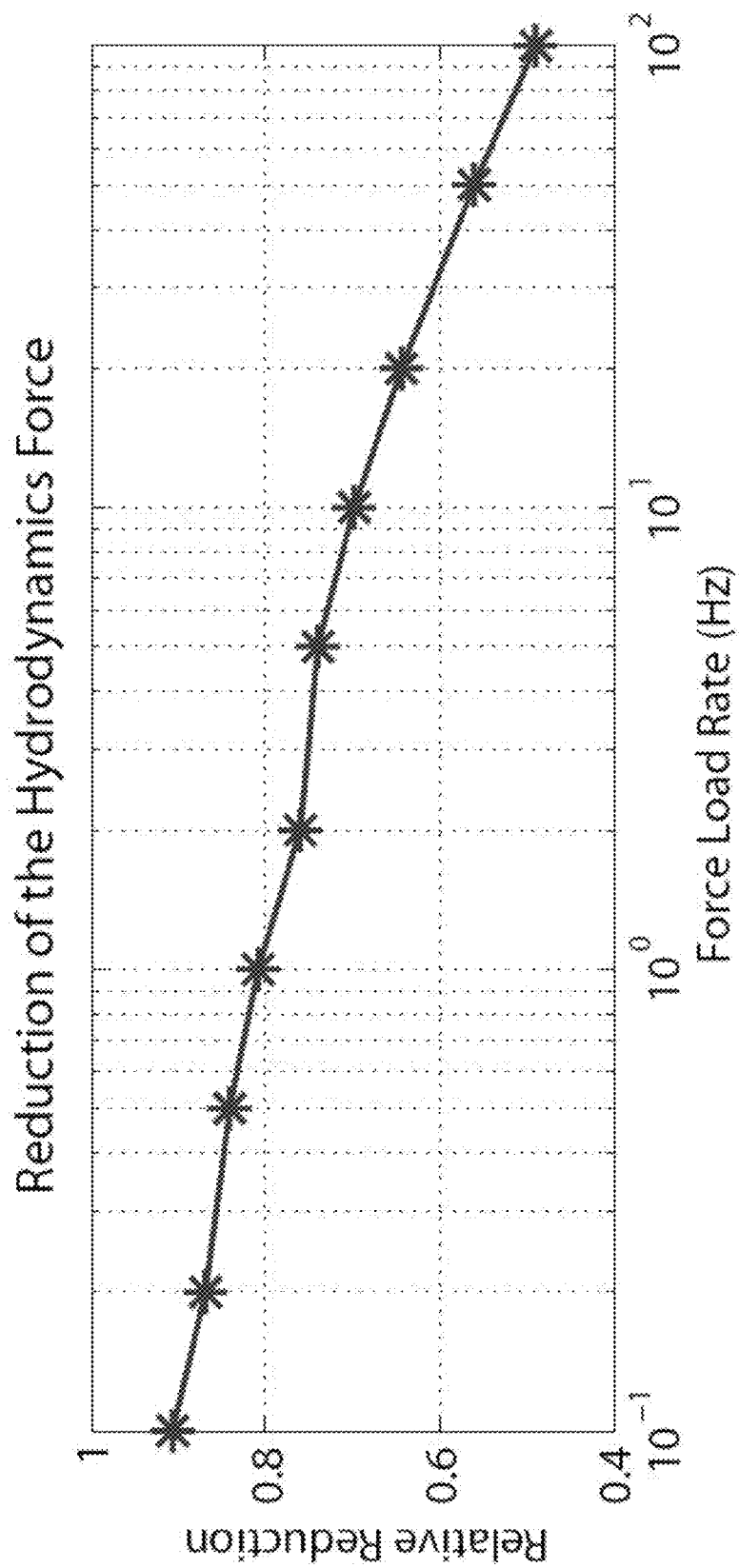
FIG. 21 is a graph illustrating the relative reduction of hydrodynamic forces.

The contribution of the hydrodynamic force to the indentation is comparatively small (a few nm versus a few hundred nm in typical live cell measurement). Additionally, to quantify $F_{hs}(t)-F_{hh}(t)$, the ration of $F_{hs}(t)-F_{hh}(t)$ to $F_{hs}(t)$ is estimated and the cantilever displacement data obtained on a fibroblast cell is shown in FIG. 21 as a function of force load rate. From FIG. 21 it is seen that the hydrodynamic force effect is reduced by over 45% when force load rate is higher than 50 Hz (corresponding to a force load speed of 30 µm/s with a total piezo displacement of 460 µm). The hydrodynamic force is reduced even further as the force load rate increases further, thereby supporting the advantage of making nanomechanical measurements of live cells with relatively high load rates, such as rates above a few hundred Hertz.

The control-based indentation quantification and nanomechanical measurement uses precision tracking of the same excitation profile on both the live cell and the reference sample having an elastic modulus with several order of magnitude higher than a live cell. Specifically, the control input applied to drive the AFM z-axis piezo actuator is obtained through iteration as follows:

$$u_1(j\omega) = \alpha d_d(j\omega), k = 1$$

$$u_{k+1}(j\omega) = \begin{cases} \frac{u_k(j\omega)}{d_k(j\omega)} d_d(j\omega) & \text{when } d_k(j\omega) \neq 0 \text{ and } d_d(j\omega) \neq 0, \quad k \geq 1, \\ 0, & \text{otherwise} \end{cases}$$

where $d_d(j\omega)$ is the desired trajectory (i.e. the cantilever deflection measured on a live cell), a is a constant, and $u_k(j\omega)$ and $d_k(j\omega)$ are the current input (i.e. input voltage to the corresponding piezo actuator) and output signals (e.g. the cantilever deflection in the $k^{th}$ iteration).

When controlling the z-axis actuator for measuring live cells or other very soft materials, applying the force stimuli repetitively at the same location of the live cell might deform and damage the sample, such as by damaging the cell membrane. Therefore, rather than attempting to accurately track a pre-specified desired excitation force on both the live cell and the hard reference, the cantilever deflection measured on the live cell during force measurement is used as the desired force profile to be tracked on the hard reference. In other words, the iterative force stimuli is applied for tracking the deflection on the hard reference material. Alternatively, the force applied on the live cell may not maintain the desired constant force load rate. This can be alleviated by applying the MIIC technique to control the force-distance measurement on a hydrogel sample with elastic modulus similar to the live cell to be measured (i.e. having an elastic modulus within the same order as the live cell) and obtaining the input signal to achieve accurate excitation force tracking on the hydrogel. By applying the obtained input to the measurement on the live cell, the desired force profile can be tracked closely.

The following example provides the results of the implementation of the control-based technique to investigate the effect of the nutrient-deprivation process on mechanical property of live mammalian cell. Specifically, the technique is employed to measure the indentation (and thereby, the elastic modulus) of live HeLa cells, nutrient-deprived HeLa cells, and fibroblast cells when the force load rate is changed by three orders of magnitude. The results shed light on the application of the proposed technique to study mechanical evolution of dynamic cellular processes such as the EMT process.

A. Cell Preparation

MEF cells and HeLa cells were maintained in DMEM (Mediatech Cat. 10017CV) supplemented with 10% fetal bovine serum (FBS, Sigma, Cat. F6178) and 1% penicillin/streptomycin (Gibco, Cat. 15070063). For AFM detection, 5×105 HeLa cells were seeded onto Collagen I-coated glass-cover (BDbiosciences, Cat. 354089) in 6-well plate and grew to complete confluence overnight. Subsequently, HeLa cells were washed with sterile 1×PBS for three times and then cultured in DMEM with or without 10% FBS for one more day before detection.

B. Experimental Setup

A triangle excitation force profile with constant load and unload rate (as employed in usual force-distance curve measurement) was applied as the desired force profile, and the load rate was varied over four orders of amplitude from 0.1 Hz to 100 Hz corresponding to the force velocity of 0.01 µm/s to 59 µm/s.

For ease of implementation, the amplitude of the input voltage (to the piezo actuator) was kept the same during the force-displacement measurement on the HeLa cell while the load/unload rate was changed. Then the applied force and the indentation generated were measured and used in the Hertz contact model to compute the elastic modulus at that load rate:

$$F_z = \frac{4}{3} \frac{E\sqrt{Ry_s^3}}{1 - v^2}$$

where R is the tip radius and E and v are the Young's modulus and the poisson ratio of the live cell, respectively.

An AFM system (Dimension Icon, Bruker AXS Inc.) that allowed direct access to the drive of the piezo actuator and both the cantilever deflection and the z-axis sensor signal was employed in the experiments. All of the control and sensor signals were acquired through a data acquisition system (NI PCI-6259) under the Matlab xPC-target environment. A cantilever of normal spring constant of 0.01 N/m was used in the experiments. The specification of the cantilever ensures that Assumptions 1 to 3 discussed above in paragraphs [0042-0043] were satisfied in the experiments (where the resonant frequency is experimentally calibrated for in-liquid cantilever oscillation). Specifically, the probe specifications were as follows:

Geometry: triangular
Spring constant 0.01 N/m
Length: 310 μm
Width: 20 μm
Tip radius: 20 nm
Tip height: 5 μm
Thickness: 0.55 μm
Resonant Frequency: 2.17 kHz Before the indentation measurement, an AFM image of the HeLa cell topography was acquired under contact-mode (scan rate: 0.2 Hz, scan size: 20 μm×20 μm) and the elastic modulus measurements were conducted near the center of the nuclei of the cell.

To quantify the elastic modulus of the HeLa cell and stressed HeLa cell, a triangle voltage signal was sent to drive the z-axis piezo actuator of the AFM system during the force curve measurement on the cell, and the load/unload force rate (i.e., the frequency of one entire push and retract operation) was varied between 0.1 Hz and 100 Hz for the following 10 different values (while the amplitude of the signal is maintained the same): $\{0.1, 0.2, 0.5\} \times k$ Hz ($k$=1, 10, 100) and 100 Hz. To minimize the distortion to the cell membrane, the triangle drive was applied for only one or two periods when the force load rate was lower or higher than 50 Hz, respectively. The drive inputs were applied successively separately with a separation time of ~3 min between each to allow the cell to recover from the previous force stimuli. For each load rate, the excitation force exerted (i.e., the cantilever deflection) on the live cell was measured and regarded as the desired excitation force profile to be tracked on the hard reference sample (a silicon sample). Then the MIIC technique was utilized to achieve accurate tracking of the given desired force profile for each load/unload rate. The iteration was terminated when the relative-RMS-tracking error of the cantilever deflection was smaller than 3%. Finally, the indentation was quantified as the difference of the cantilever base displacement on the silicon sample from that obtained on the HeLa cell. For the force load rate employed in this study (<100 Hz), the dynamics of the z-axis piezo actuator and that of the cantilever fixture (connecting the cantilever to the z-axis piezo actuator) were not excited, and hence, the cantilever base displacement can be directly measured from the z-axis sensor (that measures the z-axis piezo actuator displacement).

To study the effect of the stress process on the elastic modulus of HeLa cell, the above protocol for indentation and nanomechanical measurement was applied to the stressed HeLa cell as well. Furthermore, to evaluate the accuracy and consistency of the method, the above indentation and nanomechanical measurement protocol was repeated on other eleven HeLa cells and sixteen stressed HeLa cells.

Results

Figure 22:
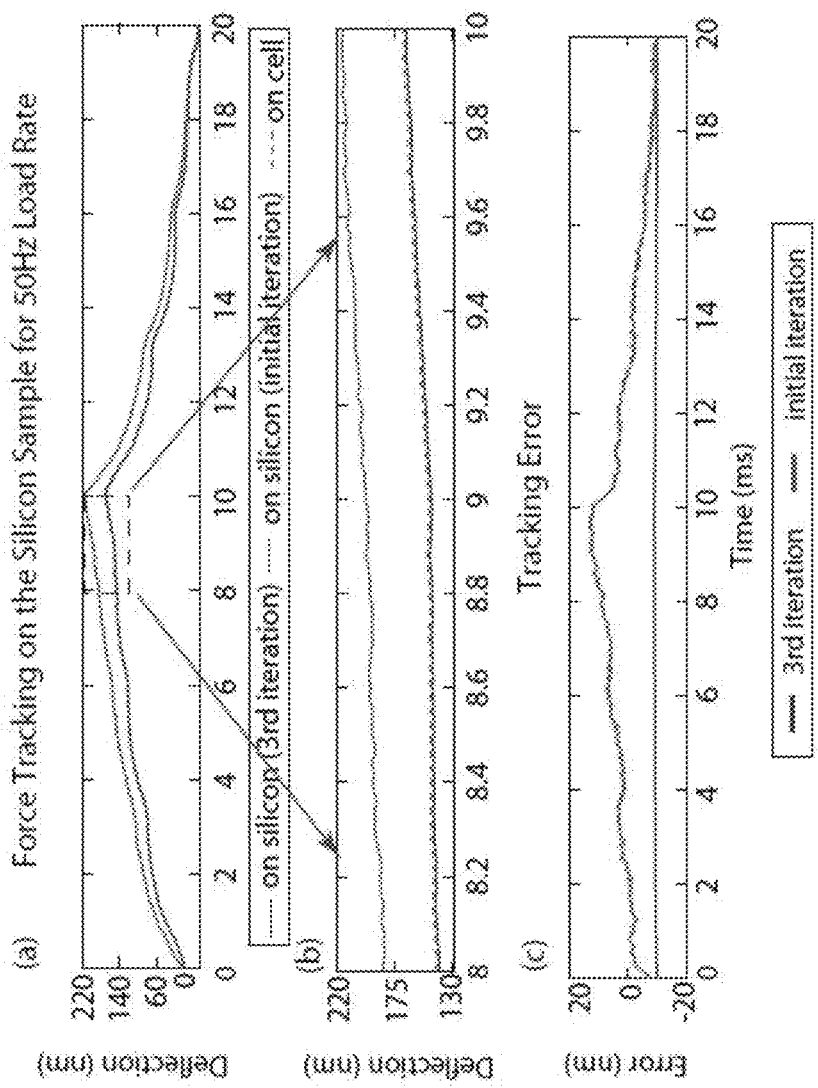
FIG. 22(A)-(C) are graphs illustrating (A) the cantilever deflection tracking results on the silicon sample; (B) an enlarged view of the tracking results in FIG. 22(A) for 2 ms; and (C) the tracking error.
Figure 23:
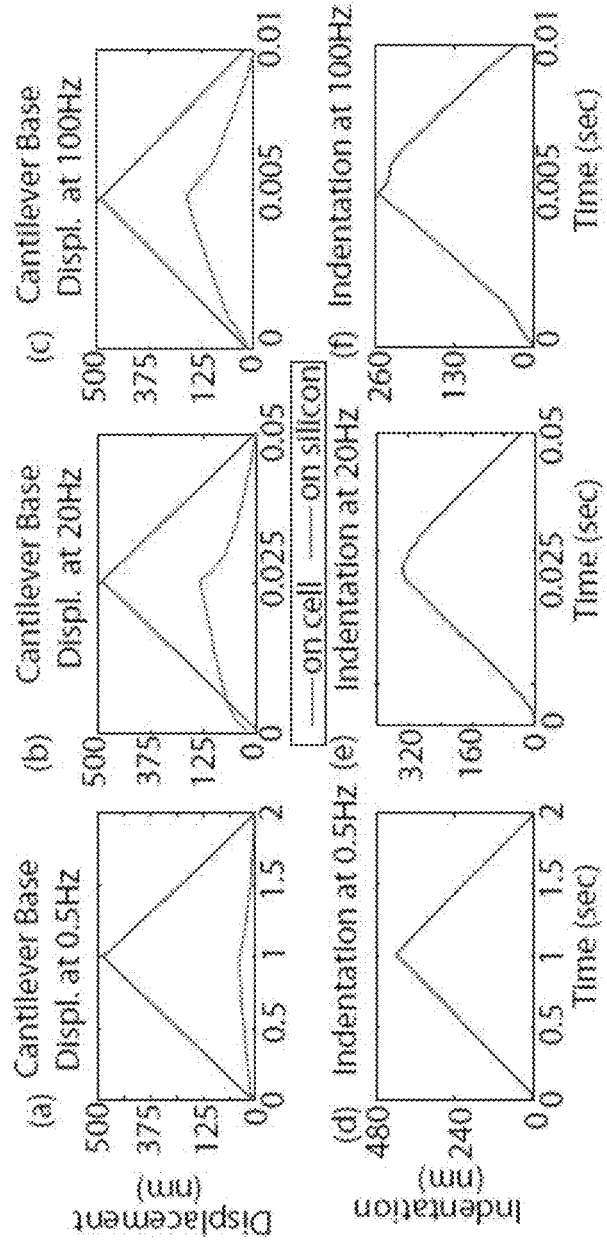
FIG. 23 (A)-(F) are graphs illustrating the cantilever base displacement of HeLa cell and silicon samples at various frequencies.

The indentation of the live HeLa cell measured by using the proposed control-based protocol is illustrated. As discussed above, accurate tracking of the same excitation force profile on both the cell and the silicon sample is employed. Such an accurate tracking has been maintained (via the use of the MIIC technique) across the load/unload force rates. As an example, the tracking of the excitation force profile (measured on the HeLa cell) on the silicon sample for the load rate of 50 Hz is shown in FIG. 22. The need of control and the efficacy of the MIIC technique to compensate for the cantilever acceleration and other adverse effects are pronounced in FIG. 22: Initially the cantilever deflection measured on the silicon sample was largely different from that measured on the HeLa cell—the relative RMS tracking error was at 23.4%. With the use of MIIC technique, such a large tracking error was dramatically reduced to 2.83% after merely three iterations. Same level of tracking precision (<3%) was maintained across all other 9 different load rates and during the measurements of all cells. We note that the remaining error was mainly a static offset (see FIG. 22(c)), which was due to the small drift of the cantilever probe in liquid. Thus, by the proposed protocol, the indentation in the HeLa cell was obtained directly from the difference of the cantilever base displacement trajectory on the HeLa cell from that on the silicon sample. As examples, the cantilever base displacement trajectory on both samples and the corresponding indentation measured were plotted in FIG. 23 for the load rates of 0.5 Hz, 20 Hz, and 100 Hz, respectively. Note that as discussed before, as even the highest load rate (100 Hz) was still far below the resonance of the z-axis piezo actuator and the cantilever fixture (for the AFM system used in this work, around 5.6 kHz and 4.3 kHz, respectively), the effects of these two dynamics were negligible—As shown in FIG. 23 (top row), the cantilever base displacement measured on the HeLa cell followed the triangle profile of the input voltage very closely, whereas on the contrary, the cantilever base displacement measured on the silicon was largely deviated from the input triangle profile, reflecting the compensation for the cantilever acceleration and the effect of the cell viscoelasticity (on the cantilever deflection).

Rate-Dependent Elastic Modulus of HeLa Cell

Figure 24:
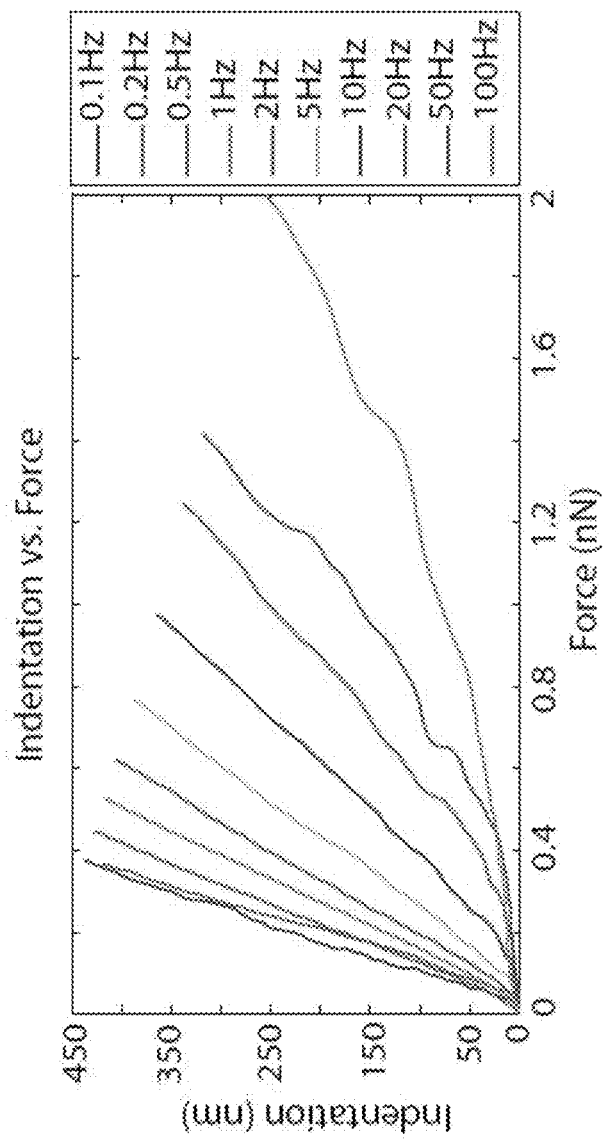
FIG. 24 is a graph illustrating the indentation-force curves measured by using a control-based protocol for various load rates.

With the proposed control-based protocol to indentation measurement established by the experiment results, we present next the rate-dependent elastic modulus measurement results. First, the indentation-force curves for the nine load rates tested in the experiment are shown in FIG. 24. The rate-dependence of the viscoelasticity of HeLa cell is evident—the slope of the indentation-force curve consistently decreases with the increase of the load/unload rate, reflecting that the HeLa cell "behaves" stiffer when the excitation force is exerted on the cell membrane at higher rate. The increasing viscoelastic behavior of the HeLa cell upon increasing force load/unload rate can also be seen from the indentation-force relation being less linear with higher load/unload rate. Moreover, we realize that as the amplitude of the input voltage (to the z-axis piezo actuator) is kept the same for each force load rate, thereby the cantilever base displacement range (at 500 nm), is kept the same in all the force-distance measurements on the HeLa cell (see FIG. 23, top row), the maximum indentation in the HeLa cell should decrease while the maximum reaction force from the cell membrane (equal to the applied force as the load/unload rate is very close to constant) should decrease—a direct result of the HeLa cell's appearing stiffer upon force stimuli of faster load/unload rate. Note the load/unload speed corresponding to the ten load/unload rates are varying between 0.01 μm/s (for 0.1 Hz) and 59 μm/s (for 100 Hz). Thus, the experimental results show that the control-based protocol clearly captures the rate-dependence of the viscoelastic behavior of the HeLa cell.

Figure 25:
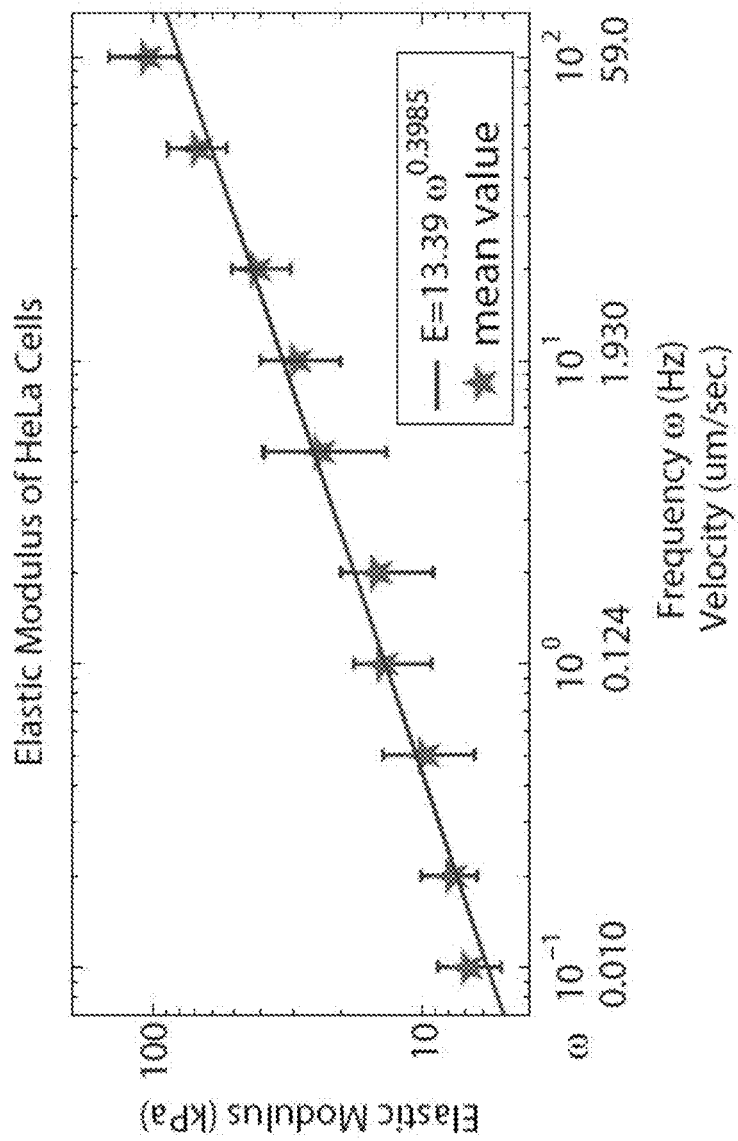
FIG. 25 is a graph illustrating the elastic modulus vs. force load rate of HeLa cells.

Next, the force-indentation curve is utilized to compute the elastic modulus of the HeLa cell at the ten different load rates via the Hertz model, where the maximum force-indentation point is used for each load rate. The obtained elastic modulus is plotted in FIG. 25 with respect to the load rate for the twelve different HeLa cells. Three observations are readily in-line: (1). The measured values of the elastic modulus of the HeLa cell for low force load rates of 0.1 Hz to 5 Hz at 6.71 kPa to 20.76 kPa, compared well to the that reported for HeLa cell at ~4–30 kPa for force load rate lower than 10 Hz. However, the measurements of elastic modulus of live cell using force-displacement curve as reported in the literature are all limited to low force load rate (<10 Hz)—10 times lower than the load rate reported in this work; (2). The elastic modulus-load rate plot (in logarithmic scale) in FIG. 25 follows a power law relation—the simple linear fitting results in E=13.39 $\omega$0.40±0.03 (kPa), as shown in FIG. 25. Such a power law modulus-rate relation agrees with those results obtained on a wide variety of live mammalian cells and via various micro-/nanorheology methods including force modulation using AFM. However, unlike those results using AFM that are all based on force modulation concept, the present results show a power-law dependence via the quasi-static force-displacement curve measurement over four orders of magnitude frequency span and up to 100 Hz. FIG. 25 also demonstrates that the measurement results are highly consistent—the standard deviation is between 4.6% (at 50 Hz) and 11.2% (at 100 Hz). The effect of the static preload force was applied in the experiment that substantially reduced the uncertainty of the initial contact point on the cell is also determined to be small: the preload applied is kept small (<50 pN), and the comparison of the indentation measured under three different preload levels (50 pN, 80 pN, and 100 pN) across the 10 different load rates shows that the variations of the indentation measured across these three different preload are small across all the load rates at less than 8%.

D. Effect of the Serum-Starvation Process on the Elastic Modulus of HeLa Cell

Figure 26:
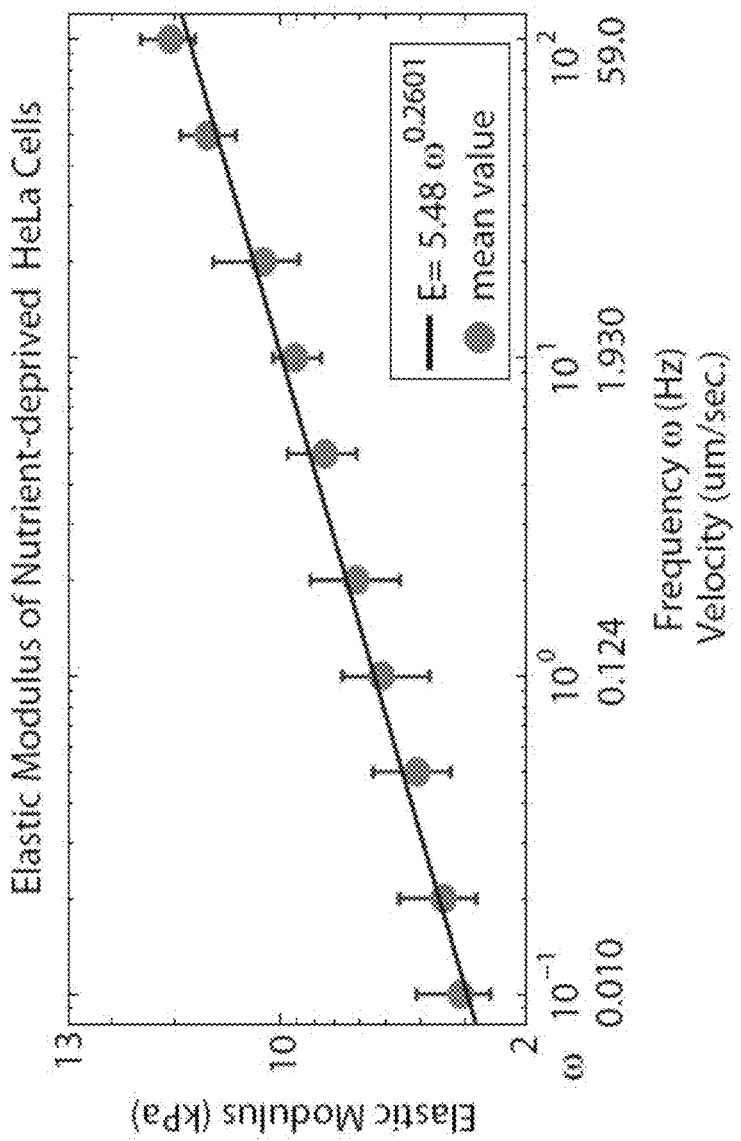
FIG. 26 is a graph illustrating the elastic modulus vs. force load rate of nutrient-deprived HeLa cells.

Finally, the rate-dependent elastic modulus of the HeLa cell before and after the stress process are compared. The elastic modulus for the ten different load rates measured on sixteen different HeLa cells after the stress-process (called "stressed HeLa cells" in the figures) is plotted in FIG. 26, and is compared with that before the stress-process in FIG. 27. Three observations can be drawn also: (1). Similar power-law dependence of the elastic modulus on the load rate (frequency)—as observed for HeLa cells before the stress-process (FIG. 25)—also holds for the HeLa cells after the stress-process (E=5.48 $\omega$0.26±0.01 (kPa)). Thus, this result also supports the statement that "the power law behavior and scale-free rheology are a common feature of cell mechanics"

(2). As for the HeLa cells before the stress-process, the measured modulus results are highly consistent. The standard deviation of the measured modulus among the 16 stressed HeLa cells is between 4.29% (at the load rate of 10 Hz) and 12.19% (at the load rate of 20 Hz).

(3). The dramatic effect of the stress-process on the mechanical properties of the HeLa cell is evident.

As shown in FIG. 27, the reduction of the elastic modulus induced by the stress-process is substantially larger than the different-cell-caused variations of the modulus, and there is no overlap between the elastic modulus of the HeLa cell before the stress-process and those after the stress-process across all 10 load rates. Moreover, the stress-process-caused reduction of the elastic modulus becomes even more significant as the load rate increases. For example, the mean value of elastic modulus at the load rate of 100 Hz reduced by 5.07 times after the stress-process. Note that experiments have also been conducted to excluded other potential causes to such a significant change of elastic modulus, including aging of the HeLa cell. The experiments were repeated on HeLa cells that were kept in the same incubator environment along with those HeLa cells under going the stress process. The measurement elastic modulus values were similar to those measured on the un-stressed HeLa cell without one more day incubation (The difference is within the standard deviation at each measured frequency). Thus, this result is among the first that measures the stress-process effect on the elastic modulus of HeLa cell for load rate of four orders of magnitude range and up to 100 Hz.

Cellular cytoskeleton determines cell morphology and mechanical properties. The highly organized cytoskeleton is dynamically regulated by internal genetic and external physical or biochemical cues. Therefore, the dynamics of cytoskeleton will affect cell morphology and mechanical properties. E-Cadherin complexes form adherens junctions and transducer mechanical forces via association with actin cytoskeletal networks. Once the number of adherens junctions reduces (i.e. in serum starvation), the integrity of original cytoskeleton will be compromised and consequently influence local mechanical properties. Here, the results show that the elasticity of HeLa cells were decreased when they acquired mesenchyme-like phenotype owing to loss of cell-cell junctions. In fact, many studies have elucidated the elastic modulus of cells can be shaped due to cellular cytoskeleton reorganization during the process of cell proliferation, differentiation, and transformation. For example, invasive tumor cells become mechanically soft when they lose connection to their neighbors. Highly metastatic cells have more reduced stiffness due to actin cytoskeleton remodeling compared to less invasive parental cells. Thus, accurate quantification of cell mechanical properties provides a novel window to evaluate the cell predisposition and fate. Taken together, cell mechanical properties are important epigenetic parameters and also important indices which can be utilized to quantitatively assess cell function, plasticity and fate.

The entire disclosure of each of the following references is incorporated herein by reference:

G. M. Pharr, W. C. Oliver, and F. R. Brotzen, "On the generality of the relationship among contact stiffness, contact area, and elastic modulus during indentation," Journal of Materials Research, vol. 7, no. 3, pp. 613-617, 1992.

B. Derjaguin, V. Muller, and Y. Toporov, "Effect of contact deformations on the adhesion of particles," Journal of Colloid And Interface Science, vol. 53, pp. 314-326, 1975.

Y.-T. Cheng and C.-M. Cheng, "General relationship between contact stiffness, contact depth, and mechanical properties for indentation in linear viscoelastic solids using axisymmetric indenters of arbitrary profiles," Applied Physics Letters, vol. 87, pp. 111914-111916, 2005.

H.-J. Butt, B. Cappella, and M. Kappl, "Force measurements with the atomic force microscope: Technique, interpretation and applications," Surface Science Reports, vol. 59, pp. 1-152, 2005.

V. Muller, V. Yushchenko, and B. Derjaguin, "General theoretical consideration of the influence of surface forces on contact deformations and the reciprocal adhesion of elastic spherical particles," Journal of Colloid And Interface Science, vol. 92, pp. 92-101, 1983.

Z. Xu and Q. Zou, "A model-based approach to compensate for the dynamics convolution effect on nanomechanical property measurement," Journal of Applied Physics, vol. 107, p. 064315, 2010.

P. Xie, Z. Xu, and Q. Zou, "Compensation for the dynamics effect on nanoscale broadband viscosity measurements using adaptive filtering approach," IEEE Trans. on Instrumentation and Measurement, vol. 60, pp. 1115-1162, 2011.

Fischer-Cripps, "Critical review of analysis and interpretation of nanoindentation test data," Surface and Coatings Technology, vol. 200, p. 41534165, 2006.

A. V. Eysden and J. E. Sader, "Resonant frequencies of a rectangular cantilever beam immersed in a fluid," Journal of Applied Physics, vol. 100, p. 114916, 2006.

J. Briscoe, L. Fiori, and E. Pelillo, "Nano-indentation of polymeric surfaces," Journal of Physics D: Applied Physics, vol. 31, p. 2395, 1998.

Zhu, G. Bao, and N. Wang, "Cell mechanics: Mechanical response, cell adhesion, and molecular deformation," Annual Review of Biomedical Engineering, vol. 2, pp. 189-226, 2000.

Z. Xu, D. Tramp, Q. Zou, P. Shrotriya, and P. Xie, "Nanoscale broadband viscoelastic spectroscopy of soft materials using iterative control," Experimental Mechanics, in press, 2011.

Z. Xu, K. Kim, Q. Zou, and P. Shrotriya, "Broadband measurement of rate-dependent viscoelasticity at nanoscale using scanning probe microscope: Poly(dimethylsiloxane) example," Applied Physics Letters, vol. 93, p. 133103, 2008.

Y. Zhang and Q. Zou, "High-speed force load in force measurement in liquid using scanning probe microscope," Review of Scientific Instruments, in press, 2011.

K. S. Kim and Q. Zou, "Model-less inversion-based iterative control for output tracking: Piezo actuator example," in Proceedings of American Control Conference, (Seattle, Wash.), pp. 2710-2715, June 2008.

B. Bharat and K. V. N., "Nanoindentation hardness measurements using atomic force microscopy," Applied Physics Letters, vol. 64, pp. 1653-1655, 1994.

R. G. Prakash, S. Hu and R. Reifenberger, "Theoretical basis of parametric-resonance-based atomic force microscopy," Physical Review B, vol. 79, no. 9, pp. 094304-1-10, 2009.

Beyder, C. Spagnoli, and F. Sachs, "Reducing probe dependent drift in atomic force microscope with symmetrically supported torsion levers," Review of Scientific Instruments, vol. 77, p. 056105, 2006.

J. Spurk and N. Aksel, Fluid Mechanics, 2nd Edition. Springer, 2008.

J. E. Sader, "Frequency response of cantilever beams immersed in viscous fluids with applications to the atomic force microscope," Journal of Applied Physics, vol. 84, pp. 64-76, 1998.

K.-S. Kim, Z. Lin, P. Shrotriya, S. Sundararajan, and Q. Zou, "Iterative control approach to high-speed force-distance curve measurement using afm: Time-dependent response of pdms example," Ultramicroscopy, vol. 108, pp. 911-920, 2008.

I.-K. Lin, K.-S. Ou, Y.-M. Liao, Y. Liu, K.-S. Chen, and X. Zhang, "Viscoelastic characterization and modeling of polymer transducers for biological applications," Journal of Microelectromechanical Systems, vol. 18, pp. 1087-1099, October 2009.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. A method of microscopy for a test specimen using an atomic force microscope having a probe that includes a cantilever beam, wherein the beam deflects in response to the probe being brought into proximity with the surface of a sample, wherein the method comprises the steps of:
   displacing the probe in a first direction;
   sensing the deflection of the cantilever beam in the first direction;
   providing signals indicative of the deflection; and
   controlling the displacement of the probe in response to the signals indicative of the deflection, wherein the step of controlling the displacement comprises the steps of:
   tracking an excitation force for a reference specimen;
   tracking an excitation force for the test specimen;
   wherein the probe is displaced such that the excitation force for the test specimen is substantially the same as the excitation force for the reference specimen.

2. The method of claim 1 comprising the step of displacing the probe in a second direction transverse the first direction.

3. The method of claim 1 comprising the step of quantifying indentation of the test specimen from the difference of the displacement of the cantilever beam when tracking the excitation force for the reference specimen and the displacement of the cantilever beam when tracking the excitation force for the test specimen.

4. The method of claim 1 wherein the step of controlling the displacement of the probe comprises implementing an iterative feedback system based on the signals indicative of deflection of the cantilever beam.

5. The method of claim 1 wherein the step of controlling displacement of the probe comprises the steps of iteratively calculating an input to be applied to a drive mechanism based on: (a) a previously applied input applied to the drive mechanism, (b) a desired deflection profile, and (c) the signals indicative of the deflection.

6. The method of claim 1 comprising the step of selecting the reference specimen so that the reference specimen has an elastic modulus at least two orders of magnitude higher than the test specimen.

7. An atomic force microscope, comprising:
   a probe comprising:
      a cantilever beam having a first end and a second end; and
      a tip attached to the second end of the beam;
      wherein the beam deflects in response to the probe being brought into proximity with the surface of a sample;
   a drive mechanism for displacing the probe in a first direction, wherein the drive mechanism is connected to the first end of the beam;
   a sensor detecting deflection of the beam in the first direction and providing signals indicative of the deflection; and
   a controller controlling the drive mechanism, wherein the controller receives the signals from the sensor and controls the operation of the drive mechanism in response to the signals;
   wherein the controller controls the drive mechanism so that the beam deflection tracks a desired deflection profile.

8. The atomic force microscope of claim 7 wherein the controller controls the drive mechanism so that the displacement of the first end of the cantilever when measuring a sample follows the displacement of the first end of the cantilever when measuring a reference material.

9. The atomic force microscope of claim 8 wherein the reference material is substantially harder than the sample.

10. The atomic force microscope of claim 7, wherein the controller iteratively calculates an input to be applied to the drive mechanism based on a previously applied input applied to the drive mechanism, the desired deflection profile, and the signals received from the sensor.

11. The atomic force microscope of claim 7 wherein the system is operable to store data regarding the deflection profile of a known standard.

12. The atomic force microscope of claim 11 wherein the controller controls the drive mechanism so that the beam deflection tracks the deflection profile of the known standard.

13. The atomic force microscope of claim 7 comprising a second drive mechanism for displacing the probe in a second direction transverse the first direction.

14. The atomic force microscope of claim 13 wherein the first and second drive mechanisms comprise piezoactuators.

15. The atomic force microscope of claim 13 comprising a second sensor for detecting displacement of the beam in the second direction.

16. The atomic force microscope of claim 7 wherein the controller implements an open-loop iterative feedback system based on the signals received from the sensor for detecting deflection of the beam.

17. The atomic force microscope of claim 7 having a measurement frequency range over 600 Hz.

* * * * *